(12) United States Patent
McKeown

(10) Patent No.: US 8,346,630 B1
(45) Date of Patent: Jan. 1, 2013

(54) METHOD AND APPARATUS TO EFFICIENTLY VERIFY INVENTORY

(75) Inventor: Neil Edward McKeown, Lodi, CA (US)

(73) Assignee: Intuit Inc., Mountain View, CA (US)

( * ) Notice: Subject to any disclaimer, the term of this patent is extended or adjusted under 35 U.S.C. 154(b) by 1662 days.

(21) Appl. No.: 11/479,622

(22) Filed: Jun. 30, 2006

(51) Int. Cl.
*G06Q 10/00* (2006.01)
*G06Q 20/00* (2012.01)

(52) U.S. Cl. ............................................. 705/28; 705/22
(58) Field of Classification Search .................. None
See application file for complete search history.

(56) References Cited

U.S. PATENT DOCUMENTS

| | | | | |
|---|---|---|---|---|
| 5,151,684 | A * | 9/1992 | Johnsen | 340/568.1 |
| 5,644,725 | A * | 7/1997 | Schmerer | 705/28 |
| 7,151,979 | B2 * | 12/2006 | Andersen et al. | 700/214 |
| 7,499,865 | B2 * | 3/2009 | Aggarwal et al. | 705/7.11 |
| 7,925,550 | B2 * | 4/2011 | Kataria et al. | 705/28 |
| 2006/0178953 | A1 * | 8/2006 | Aggarwal et al. | 705/28 |
| 2007/0262142 | A1 * | 11/2007 | Whitehouse et al. | 235/385 |
| 2009/0099942 | A1 * | 4/2009 | Aggarwal et al. | 705/28 |

* cited by examiner

*Primary Examiner* — Mussa A Shaawat
(74) *Attorney, Agent, or Firm* — McKay and Hodgson, LLP; Philip McKay; Sean P. Lewis

(57) ABSTRACT

A method and apparatus to efficiently verify inventory includes a process for verifying inventory in sub-sets using trigger parameters whereby priority status triggers are defined which indicate that an inventory item is particularly susceptible to inaccuracies/discrepancies between physical inventory and inventory as calculated by a computing system implemented financial management system. In one embodiment, transactions and/or events associated with units of the inventory item, or inventory item class, are then monitored for occurrence of any of the priority status triggers. In one embodiment, if one or more priority status triggers occur associated with the given inventory item, or inventory item class, the inventory item, or inventory item class, is given priority verify status indicating that the inventory item, or inventory item class, should be physically inventoried on a priority basis.

16 Claims, 6 Drawing Sheets

ALERT! 241
Due to one or more
events and/or
transactions involving
units of inventory item
A, inventory item A has
been given priority
verify status and
therefore a physical
inventory of inventory
item A should be
undertaken on a priority
basis
Please Indicate Receipt of this
Alert by Clicking on the
"RECIEVED" Box Provided Below

243  ☐ RECIEVED 230
231
240

ALERT! 441

Inventory item A has been given priority verify status. A list of all priority verify status inventory items is provided below along with their relative priority level.

1. INVENTORY ITEM D - Priority 1

2. INVENTORY ITEM A - Priority 1

3. INVENTORY ITEM H - Priority 2

4. INVENTORY ITEM C - Priority 3

Please Indicate Receipt of this Alert by Clicking on the "RECIEVED" Box Provided Below

443 ☐ RECIEVED

METHOD AND APPARATUS TO EFFICIENTLY VERIFY INVENTORY

BACKGROUND

Many businesses, such as wholesale, retail and manufacturing establishments, deal in numerous items or products that are either offered directly for sale, or are used in connection with a service or product offered and/or manufactured by the business. Often large quantities of each of these items must be kept in inventory, i.e., purchased and stored/warehoused by, or for, the business owner for extended periods of time to ensure the items are available when needed. In addition, it is often cost-effective to purchase large quantities of individual units of given inventory item in order to take advantage of volume discounting. As a result, many businesses often have large amounts of operating capital invested in various inventory items owned by the business and stored/warehoused either by, or for, the business.

In many instances, in order for a business maintaining inventory items to efficiently conduct business, ensure that enough units of various inventory items are available to meet demand, and make informed and intelligent buying decisions, it is important for the business manager or owner to track the inventory items closely.

For example, a business owner's decision to purchase, or not purchase, replacement units of an inventory item, or how many units to purchase, in order to maintain stock levels largely depends on the number of units of one or more inventory items already in inventory/stock. Consequently, an inaccurate count of the number of units of one or more inventory items in stock can result in either too many replacement units being purchased, resulting in an inefficient use of operating capital and warehouse space, or too few replacement units being purchased, resulting in failure to meet demand, lost revenue, and potential customer loss, or failure to maintain parts in stock to manufacture other goods, or provide other services, and again a failure to meet demand, lost revenue, and potential customer loss.

In addition, accurate tracking of inventory items is necessary to calculate the value of a business accurately, as might be required to obtain lines of credit, or more favorable interest rates on lines of credit. In addition, an accurate tracking of inventory items is often necessary to determine a business's tax liability and/or any changes in inventory that can be expensed, such as changes due to theft, breakage, or loss.

In order to meet the need to accurately track inventory items, many businesses employ computing system implemented financial management systems. Various computing system implemented financial management systems are available including: computing system implemented business financial management systems; computing system implemented sales and inventory tracking systems; computing system implemented tax preparation systems; computing system implemented business accounting systems; as well as various other electronic transaction data driven financial management systems.

Computing system implemented business financial management systems typically provide a centralized interface with banks, and other various financial institutions, and inventory suppliers, for electronically tracking financial transactions to allow a user, such as a business owner or manager, to, for example, balance checkbooks, pay bills, track expenditures, and create and manage sales, payroll, and operating budgets.

Computing system implemented sales and inventory tracking systems help users: manage and track inventory; track sales and purchases; manage expenses; and manage operating costs. Often the computing system implemented sales and inventory tracking system is a component or function of a parent computing system implemented business financial management system.

As noted above, computing system implemented financial management systems, such as computing system implemented business financial management systems and/or computing system implemented sales and inventory tracking systems are extremely useful for helping a business owner more accurately track inventory. However, several events and/or actions that commonly involve inventory items or individual units of inventory items are typically outside the computing system implemented financial management system transaction base, and therefore outside the computing system implemented financial management system's tracking capability. For instance, theft, breakage, loss, and various other events common in a business environment, are typically not recognized by, or brought to the attention of, a computing system implemented financial management system. In addition, any errors in entering inventory data into the computing system implemented financial management system would also not be readily apparent based on the information provided by the computing system implemented financial management system, that is to say, incorrect information entered into the computing system implemented financial management system yields incorrect information out.

Consequently, in order to ensure the validity of inventory, a business owner, whether employing a computing system implemented financial management system or not, is typically required to perform a manual "physical" inventory of the entire stock, i.e. count each individual physical unit of each inventory item on a regular periodic basis. However, the performance of a "physical" inventory of the entire stock is typically extremely time intensive and, typically, can only be performed accurately when the business is closed. Therefore, physical inventory is usually not conducted as often as would be ideal, and, when conducted, is often conducted with reluctance and almost always at significant commercial cost.

SUMMARY

In accordance with one embodiment, a method and apparatus to efficiently verify inventory includes a process for verifying inventory in sub-sets using trigger parameters whereby priority status triggers are defined. In one embodiment, the priority status triggers are trigger parameters or trigger events that often indicate that an inventory item is particularly susceptible to inaccuracies and/or discrepancies between physical inventory counts and inventory as calculated by the computing system implemented financial management system employing the process for verifying inventory in sub-sets using trigger parameters.

In one embodiment, transactions and/or events associated with individual units of the inventory item, or inventory item class, are then monitored for occurrence of any of the priority status triggers. In one embodiment, if one or more priority status triggers occur associated with the given inventory item, or inventory item class, that inventory item, or inventory item class, is assigned priority verify status indicating that the inventory item, or inventory item class, should be physically inventoried on a priority basis.

In one embodiment, data representing the identification of a given inventory item, or inventory item class, is obtained and stored through a computing system implemented financial management system implementing the process for verifying inventory in sub-sets using trigger parameters.

In one embodiment, priority status triggers are then defined and stored and transactions and/or events associated with units of the inventory item, or inventory item class, are then monitored using the computing system implemented financial management system employing process for verifying inventory in sub-sets using trigger parameters for occurrence of any of the priority status triggers and/or priority status trigger events.

In one embodiment, if one or more priority status triggers occur associated with the given inventory item, or inventory item class, the inventory item, or inventory item class, is given priority verify status indicating that the inventory item, or inventory item class, should be physically inventoried on a priority basis. In one embodiment, once an inventory item, or inventory item class, is given priority verify status, the user is alerted to the change of status and a recommendation that the given inventory item, or inventory item class, be physically inventoried for verification on a priority basis is issued.

In one embodiment, when two or more inventory items, or inventory item classes, are given priority verify status, the two or more inventory items, or inventory item classes, are further prioritized based on various factors including the number of priority status triggers having occurred, and/or the severity/type of priority status triggers having occurred and/or other user-defined parameters.

Using the method and apparatus to efficiently verify inventory and a process for verifying inventory in sub-sets using trigger parameters, disclosed herein, inventory items, or classes of inventory items, that are particularly subject to inaccuracies and/or discrepancies between actual physical inventory count and inventory as calculated using a computing system implemented financial management system are automatically, and dynamically, identified for the user, such as a small-business owner, based on actual events involving units of the inventory item or inventory class. Consequently, the user can prioritize inventory items, or inventory item classes, to be physically inventoried. As a result, the process for verifying inventory in sub-sets using trigger parameters disclosed herein provides the user with an opportunity to perform physical inventory counts, incrementally and/or rotationally, on relatively small sub-sets of inventory items, while at the same time providing most of the accuracy and benefits of a full physical inventory of all individual units of all inventory items. In addition, a full physical inventory of all individual units of all inventory items can still be performed, but using the process for verifying inventory in sub-sets using trigger parameters disclosed herein, the full physical inventory can be performed incrementally and/or rotationally in sub-sets of the entire inventory over time using a schedule based on the information provided by the process for verifying inventory in sub-sets using trigger parameters.

In addition, as discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

FIG. 2B shows one embodiment of an alert generated and displayed on a display device in accordance with one embodiment of a process for verifying inventory in sub-sets using trigger parameters;

FIG. 4B shows one embodiment of an alert generated and displayed on a display device in accordance with one embodiment of a process for verifying inventory in sub-sets using trigger parameters.

Figure 1:
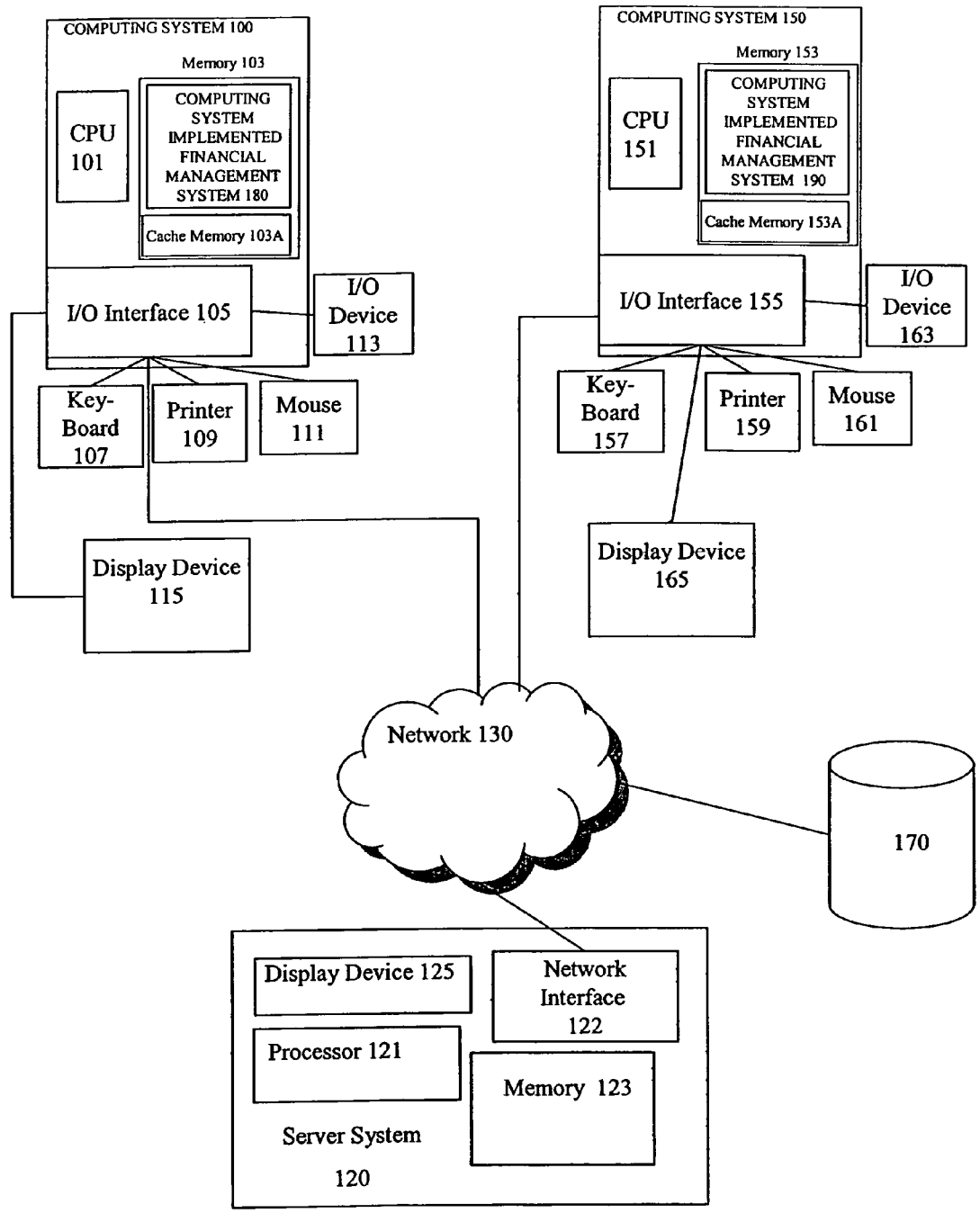
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and apparatus to efficiently verify inventory includes a process for verifying inventory in sub-sets using trigger parameters (200 in FIG. 2A, 300 in FIG. 3, and 400 in FIG. 4A) whereby priority status triggers are defined. In one embodiment, the priority status triggers are trigger parameters or trigger events that often indicate that an inventory item is particularly susceptible to inaccuracies and/or discrepancies between physical inventory counts and inventory as calculated by the computing system implemented financial management system employing the process for verifying inventory in sub-sets using trigger parameters.

In one embodiment, transactions and/or events associated with individual units of the inventory item, or inventory item class, are then monitored for occurrence of any of the priority status triggers. In one embodiment, if one or more priority status triggers occur associated with the given inventory item, or inventory item class, that inventory item, or inventory item class, is assigned priority verify status indicating that the inventory item, or inventory item class, should be physically inventoried on a priority basis.

In one embodiment, data representing the identification of a given inventory item, or inventory item class, is obtained and stored through a computing system implemented financial management system implementing the process for verifying inventory in sub-sets using trigger parameters.

In one embodiment, priority status triggers are then defined and stored and transactions and/or events associated with units of the inventory item, or inventory item class, are then monitored using the computing system implemented financial management system employing process for verifying inventory in sub-sets using trigger parameters for occurrence of any of the priority status triggers.

In one embodiment, if one or more priority status triggers occur associated with the given inventory item, or inventory item class, the inventory item, or inventory item class, is given priority verify status indicating that the inventory item, or inventory item class, should be physically inventoried on a priority basis. In one embodiment, once an inventory item, or inventory item class, is given priority verify status, the user is alerted to the change of status and a recommendation that the given inventory item, or inventory item class, be physically inventoried for verification on a priority basis is issued.

In one embodiment of a process for verifying inventory in sub-sets using trigger parameters (400 in FIG. 4A) when two or more inventory items, or inventory item classes, are given priority verify status, the two or more inventory items, or inventory item classes, are further prioritized based on various factors including the number of priority status triggers having occurred, and/or the severity/type of priority status triggers having occurred and/or other user-defined parameters.

Using the method and apparatus to efficiently verify inventory and a process for verifying inventory in sub-sets using trigger parameters, disclosed herein, inventory items, or classes of inventory items, that are particularly susceptible to inaccuracies and/or discrepancies between actual physical inventory count and inventory as calculated using a computing system implemented financial management system are automatically, and dynamically, identified for the user, such as a small-business owner, based on actual events involving units of the inventory item or inventory class. Consequently, the user can prioritize inventory items, or inventory item classes, to be physically inventoried. As a result, the process for verifying inventory in sub-sets using trigger parameters disclosed herein provides the user with an opportunity to perform physical inventory counts, incrementally and/or rotationally, on relatively small sub-sets of inventory items, while at the same time providing most of the accuracy and benefits of a full physical inventory of all individual units of all inventory items. In addition, a full physical inventory of all individual units of all inventory items can still be performed, but using the process for verifying inventory in sub-sets using trigger parameters disclosed herein, the full physical inventory can be performed incrementally and/or rotationally in sub-sets of the entire inventory over time using a schedule based on the information provided by the process for verifying inventory in sub-sets using trigger parameters.

As used herein, the term computing system implemented financial management system includes, but is not limited to: computing system implemented business financial management systems, packages, programs, modules, or applications; computing system implemented inventory and sales tracking systems, packages, programs, modules, or applications; computing system implemented personal and small business financial management systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether available or known at the time of filing or as developed later.

For illustrative purposes, embodiments are described within the framework of, and using, one or more computing system implemented financial management systems, this and other various specific details are discussed below, and shown in the accompanying FIG.s, to aid one of skill in the art in understanding the invention. However, such specific details are intended to be illustrative only, and are not intended to restrict in any way the scope as claimed herein. In addition, the particular terminology used herein is intended to be illustrative and exemplary only, and in no way limits the scope as claimed.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether available or known at the time of filing or as developed later. Some embodiments are implemented in a mobile computing system running mobile operating systems such as Symbian® OS, Windows® Mobile, or any other operating system designed to generally manage operations on a mobile computing system, whether available or known at the time of filing or as developed later. As described more fully below, embodiments can be implemented on computing systems other than a conventional computing system such as, for example, a personal digital assistant, a cell phone, or other computing system capable of processing computer readable data, whether available at the time of filing or as developed later. Computing systems also include those in which one or more computing resources (hardware or software) are located remotely and accessed via network, such as a Local Area Network (LAN), Wide Area Network (WAN), a public network, such as the Internet, a private network, or other electronic medium in which data may be exchanged between one computing system and one or more other computing system(s), whether available at the time of filing or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, the computing system implemented financial management systems described herein make use of input provided to the computer device implementing the process and/or application for verifying inventory in sub-sets using trigger parameters, discussed herein, via user interface devices such as a keyboard, mouse, touchpad, or any other device capable of providing user input to a computing system or for translating user actions into computing system operations, whether available or known at the time of filing or as developed later.

Hardware System Architecture

FIG. 1 is a block diagram of an exemplary hardware architecture for implementing one embodiment of a process and/or application for verifying inventory in sub-sets using trigger parameters, discussed herein, that includes: a computing system 100, e.g., a first computing system; a computing system 150, e.g., a second computing system; a server system 120; and a database 170, all operatively connected by a network 130.

As seen in FIG. 1, computing system 100 typically includes a central processing unit (CPU) 101, hereinafter processor 101, an input/output (I/O) interface 105, and a memory system 103, including cache memory 103A. In one embodiment, memory system 103 includes one or more computing system implemented financial management systems 180 stored, in whole, or in part, therein, that are a parent system for, are used by, or include, as discussed below, a process and/or application for verifying inventory in sub-sets using trigger parameters, such as processes 200, 300, and 400, discussed below.

Computing system 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of inputting data to, and outputting data from, computing system 100, whether available or known at the time of filing or as later developed. As discussed in more detail below, in one embodiment, a process and/or application for verifying inventory in sub-sets using trigger parameters, such as processes 200, 300, and 400, and a computing system implemented financial management system 180, can be loaded, in whole, or in part, into computing system 100 via I/O device 113, such as from a CD, DVD or floppy disk containing all, or part, of computing system implemented financial management system 180.

Similarly, computing system 150 typically includes a central processing unit (CPU) 151, hereinafter processor 151, an input/output (I/O) interface 155, and a memory system 153, including cache memory 153A. In one embodiment, memory system 153 includes one or more computing system implemented financial management systems 190 stored, in whole, or in part, therein, that are a parent system for, are used by, or include, as discussed below, a process and/or application for verifying inventory in sub-sets using trigger parameters, such as processes 200, 300, and 400.

Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed. As discussed in more detail below, in one embodiment, a process and/or application for verifying inventory in sub-sets using trigger parameters, such as processes 200, 300, and 400, and a computing system implemented financial management system 190, can be loaded, in whole, or in part, into computing system 150 via I/O device 163, such as from a CD, DVD or floppy disk containing all, or part, of computing system implemented financial management system 190.

Also shown in FIG. 1 is database 170. In one embodiment, database 170 is a designated server system or computing system, or a designated portion of a server system or computing system, such as computing systems 100, 150 and 120. In one embodiment, database 170 is a dedicated mass storage device implemented in software, hardware, or a combination of hardware and software. In one embodiment, database 170 is a web-based function. As discussed in more detail below, in one embodiment, a process and/or application for verifying inventory in sub-sets using trigger parameters, such as processes 200, 300, and 400, and/or computing system implemented financial management system 180 and/or computing system implemented financial management system 190 are stored in whole, or in part, in database 170.

In one embodiment, computing systems 100 and 150, and database 170, are coupled to a server system 120 by network 130. Server system 120 typically includes a server system display device 125, a server system processor 121, a server system memory 123, and a server system network interface 122. As discussed in more detail below, in one embodiment, a process and/or application for verifying inventory in sub-sets using trigger parameters, such as processes 200, 300, and 400, and a computing system implemented financial management system 180 and/or computing system implemented financial management system 190 are stored in whole, or in part, in server system 120.

Network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed. In various embodiments, server system network interface 122 and I/O interfaces 105 and 155 include analog modems, digital modems, a network interface card, a broadband connection, or any other means for communicably coupling computing systems 100 and 150, database 170, and server system 120, via network 130, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network, as discussed herein. In addition, the particular type of, and configuration of, computing systems 100 and 150, database 170, and server system 120 are not relevant.

As discussed in more detail below, in one embodiment, a process and/or application for verifying inventory in sub-sets using trigger parameters, such as processes 200, 300, and 400, and a computing system implemented financial management system 180 and/or computing system implemented financial management system 190 are stored in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for verifying inventory in sub-sets using trigger parameters, such as processes for verifying inventory in sub-sets using trigger parameters 200, 300, and/or 400, and a computing system implemented financial management system, such as computing system implemented financial management systems 180 and/or 190, are sometimes referred to herein, alternatively, as a process, an application, a module, a program, a component of a software system, a component of a software package, a component of a parent system, or a feature of a parent system, this terminology is illustrative only. In some embodiments, a process and/or application for verifying inventory in sub-sets using trigger parameters, such as processes 200, 300, and 400, and a computing system implemented financial management system, such as computing system implemented financial management systems 180 and/or 190, discussed herein, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as processors 101 and 151, or server system processor 121. In one embodiment, execution of a process and/or application for verifying inventory in sub-sets using trigger parameters, such as processes 200, 300, and 400, and a computing system implemented financial management system, such as computing system implemented financial management systems 180 and/or 190, discussed herein, by processor 101, processor 151, or server system processor 121, results in the operations of an agent computer process (not shown) and/or a rule computer process (not shown).

In one embodiment, a process and/or application for verifying inventory in sub-sets using trigger parameters, such as processes 200, 300, and 400, and a computing system implemented financial management system, such as computing system implemented financial management systems 180 and/or 190, discussed herein, are a computer application or process implemented and/or run and/or stored, in full, or in part, in, or on, a computer program product. Herein, a computer program product comprises a medium configured to store or transport computer readable code, whether available or known at the time of filing or as later developed. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, the medium also may be removed from the computing system.

For example, all, or part, of a process and/or application for verifying inventory in sub-sets using trigger parameters, such as processes 200, 300, and 400, and a computing system implemented financial management system, such as computing system implemented financial management systems 180 and/or 190, discussed herein, may be stored in a memory that is physically located in a location, such as server system memory 123, or database 170, of FIG. 1, different from a computing system, such as computing systems 100 and/or 150 of FIG. 1, utilizing a process and/or application for verifying inventory in sub-sets using trigger parameters, such as processes 200, 300, and 400, and a computing system implemented financial management system, such as computing system implemented financial management systems 180 and/or 190. In one embodiment, all, or part, of a process and/or application for verifying inventory in sub-sets using trigger parameters, such as processes 200, 300, and 400, and a computing system implemented financial management system, such as computing system implemented financial management systems 180 and/or 190, discussed herein, may be stored in a memory that is physically located, separate from the computing system's processor(s), such as processors 101 and 151 of FIG. 1, and the computing system processor(s) can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server systems, such as computing systems 100 and/or 150 and/or server system 120 of FIG. 1, running and/or utilizing and/or storing all, or part, of a process and/or application for verifying inventory in sub-sets using trigger parameters, such as processes 200, 300, and 400, and a computing system implemented financial management system, such as computing system implemented financial management systems 180 and/or 190, discussed herein, is a portable computer, a workstation, a two-way pager, a cellular telephone, a smart phone, a digital wireless telephone, a personal digital assistant, a server computer, an Internet appliance, or any other device that includes components that can execute all, or part, of a process and/or application for verifying inventory in sub-sets using trigger parameters, such as processes 200, 300, and 400, and a computing system implemented financial management system, such as computing system implemented financial management systems 180 and/or 190, discussed herein, in accordance with at least one of the embodiments as described herein. Similarly, in another embodiment, a process and/or application for verifying inventory in sub-sets using trigger parameters, such as processes 200, 300, and 400, and a computing system implemented financial management system, such as computing system implemented financial management systems 180 and/or 190, discussed herein, are implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the processes as described herein.

Process

In accordance with one embodiment, a method and apparatus to efficiently verify inventory includes a process for verifying inventory in sub-sets using trigger parameters. In one embodiment, priority status triggers are defined which indicate that an inventory item is particularly susceptible to inaccuracies and/or discrepancies between physical inventory and inventory as calculated by the computing system implemented financial management system. In one embodiment, transactions and/or events associated with units of the inventory item, or inventory item class, are then monitored for occurrence of any of the priority status triggers. In one embodiment, if one or more priority status triggers occur associated with the given inventory item, or inventory item class, that inventory item, or inventory item class is given priority verify status indicating that the inventory item, or inventory item class, should be physically inventoried on a priority basis and an alert is generated.

Figure 2A:
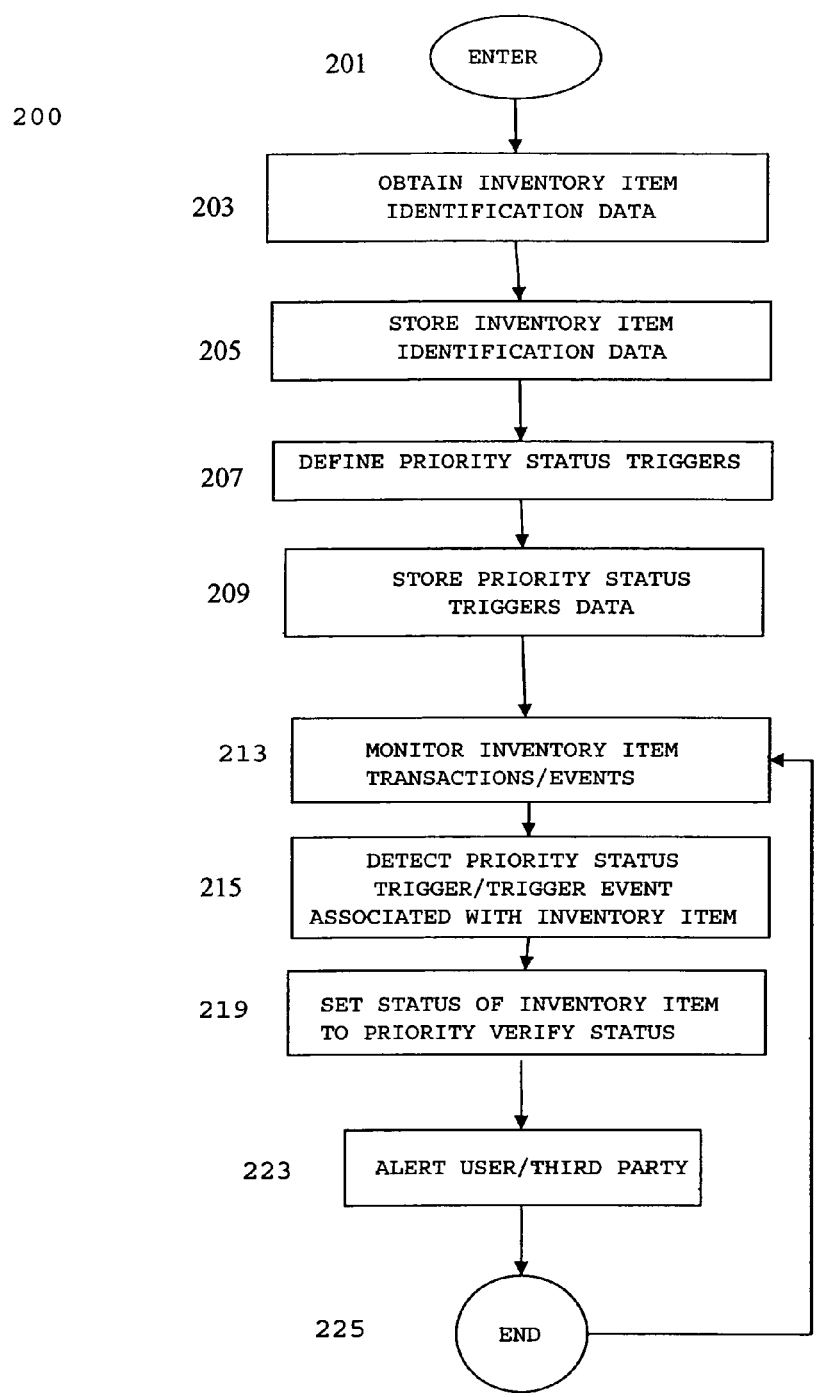
FIG. 2A is a flow chart depicting a process for verifying inventory in sub-sets using trigger parameters in accordance with one embodiment.

FIG. 2A is a flow chart depicting a process for verifying inventory in sub-sets using trigger parameters 200 in accordance with one embodiment. Process for verifying inventory in sub-sets using trigger parameters 200 begins at ENTER OPERATION 201 and process flow proceeds to OBTAIN INVENTORY ITEM IDENTIFICATION DATA OPERATION 203.

At OBTAIN INVENTORY ITEM IDENTIFICATION DATA OPERATION 203, data regarding the identification of an inventory item, or an inventory item class, is obtained by any one of several methods known to those of skill in the art, whether at the time of filing or as developed thereafter.

As used herein, the term "inventory item" includes a general inventory item listing for multiple individual units of the inventory item. By way of illustration, as used herein the term inventory item "green widget" would include, as a specific example, all "green widget" units in the inventory of the user. As used herein the term inventory item "unit" or inventory item "individual unit" includes individual units of a type indicated by the inventory item.

Further, as used herein, the term "inventory item class" include multiples "inventory items" that are related based on a selected/defined class attribute. By way of illustration, continuing with the example above, as used herein the term inventory item class "widgets" includes "widgets" of all colors, such as green widgets, red widgets, blue widgets, or any other color widgets, in the user's inventory, with "widget" being the selected/defined class attribute.

In one embodiment, data regarding the identification of an inventory item, or an inventory item class, is obtained at OBTAIN INVENTORY ITEM IDENTIFICATION DATA OPERATION 203 through manual entry of the information by the user via a user interface device such as a keyboard, such as keyboard 107, 157, of FIG. 1, a mouse, such as mouse 111, 161 of FIG. 1, a touchpad, a voice recognition system, or any other device capable of providing user input to a computing system or for translating user actions into computing system operations, whether available or known at the time of filing or as developed thereafter.

Returning to FIG. 2A, in one embodiment, data regarding the identification of an inventory item, or an inventory item class, is obtained at OBTAIN INVENTORY ITEM IDENTIFICATION DATA OPERATION 203 through one or more computing system implemented financial management systems, such as computing system implemented financial management systems 180 and 190 of FIG. 1, already being implemented by the user.

Various computing system implemented financial management systems are available including, but not limited to: computing system implemented business financial management systems; computing system implemented sales and inventory tracking systems; computing system implemented tax preparation systems; computing system implemented business accounting systems; and computing system implemented medical expense management systems; as well as various other electronic transaction data driven financial management systems; or any of the computing system implemented financial management systems discussed herein, known in the art at the time of filing, or as later developed.

One or more of these computing system implemented financial management systems would often already be implemented by a user of process for verifying inventory in sub-sets using trigger parameters 200 and, in some embodiments, process for verifying inventory in sub-sets using trigger parameters 200 is a component, function, or module, or add-on module, of a parent computing system implemented financial management system.

Several computing system implemented business financial management systems provide a centralized interface with banks, and other various financial institutions, for electronically tracking financial transactions to allow a user to, for example, balance checkbooks, pay bills, track expenditures, and create and manage sales, payroll, and operating budgets. Some computer implemented business financial management systems allow a user to track the nature of financial transactions, whether the transaction involved using checks, cash, credit cards, or electronic payment, and categorize each transaction as a particular type of income or expense.

Computing system implemented sales and inventory tracking systems help users: manage and track inventory; track sales and purchases; manage expenses; and manage operating costs. Often the computing system implemented sales and inventory tracking system is a component or function of a computing system implemented business financial management system.

Computing system implemented business accounting systems help users perform various accounting tasks by providing an accounting system framework and providing various user interfaces that, when provided with various inventory and transaction data, organize and categorize the inventory and transaction data. Computing system implemented business accounting systems are also often a component or function of a computing system implemented business financial management system.

In one embodiment, a user implementing any of the computing system implemented financial management systems discussed above will often already have obtained/entered data representing identification of an inventory item, or inventory item class, using the computing system implemented financial management system. Consequently, in one embodiment, data regarding the identification of an inventory item, or an inventory item class, is obtained at OBTAIN INVENTORY ITEM IDENTIFICATION DATA OPERATION 203 by interfacing with, and gathering the data from, any computing system implemented financial management system, such as discussed above, or otherwise available and known in the art, whether available at the time of filing or as developed later.

In one embodiment, data regarding the identification of an inventory item, or an inventory item class, is obtained at OBTAIN INVENTORY ITEM IDENTIFICATION DATA OPERATION 203 through electronic invoice and/or transaction records generated at the time of purchase, or sale, of the inventory item and typically kept by the user either using a computing system implemented financial management system or by saving the electronic invoice and/or transaction record by one or more of the various mechanisms for storing data known to those of skill in the art, and/or as discussed below, and/or as developed later.

In one embodiment, data regarding the identification of an inventory item, or an inventory item class, is obtained at OBTAIN INVENTORY ITEM IDENTIFICATION DATA OPERATION 203 through barcodes or RFID on the units of the inventory item itself and/or by scanning and/or receiving the information directly from the units of the inventory item, or its packaging, as the inventory item is purchased and/or put into inventory and/or warehoused and/or moved and/or sold.

In other embodiments, data regarding the identification of an inventory item, or an inventory item class, is obtained at OBTAIN INVENTORY ITEM IDENTIFICATION DATA OPERATION 203 by any means, whether known or available at the time of filing or as later developed, for entering data associated with an inventory item into a computing system, computing device, database, server system, web page, or any other data storage and/or data display and/or data manipulation means or mechanism, whether known or available at the time of filing, or as later developed.

In one embodiment, once data regarding the identification of an inventory item, or an inventory item class, is obtained at OBTAIN INVENTORY ITEM IDENTIFICATION DATA OPERATION 203, process flow proceeds to STORE INVENTORY ITEM IDENTIFICATION DATA OPERATION 205.

At STORE INVENTORY ITEM IDENTIFICATION DATA OPERATION 205 the data regarding the identification of the inventory item, or the inventory item class, obtained at OBTAIN INVENTORY ITEM IDENTIFICATION DATA OPERATION 203 is stored and/or saved by storing/saving the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in a computer readable medium, and/or any other computer program product, as defined herein. In one embodiment, the data, in whole, or in part, is stored on a webpage or in a web-based system.

In some embodiments, the means for storing the data described above are maintained, in whole, or in part, by: the user, or a user computing system; a third party data storage institution; the provider of a parent computing system implemented financial management system employing a process for verifying inventory in sub-sets using trigger parameters, such as processes 200, 300, and/or 400; the provider of a process for verifying inventory in sub-sets using trigger parameters, such as processes 200, 300, and/or 400; any third party service or institution; or any other parties.

Once the data regarding the identification of an inventory item, or an inventory item class, obtained at OBTAIN INVENTORY ITEM IDENTIFICATION DATA OPERATION 203 is stored and/or saved at STORE INVENTORY ITEM IDENTIFICATION DATA OPERATION 205, process flow proceeds to DEFINE PRIORITY STATUS TRIGGERS OPERATION 207.

At DEFINE PRIORITY STATUS TRIGGERS OPERATION 207 priority status triggers and/or priority status trigger events are defined by the user and/or a provider of process for verifying inventory in sub-sets using trigger parameters 200. In one embodiment, priority status triggers and/or priority status trigger events are defined that indicate that an inventory item, or inventory item class, is particularly susceptible to inaccuracies and/or discrepancies between physical inventory count and inventory as calculated by the computing system implemented financial management system.

In one embodiment, in addition to defining priority status triggers and/or priority status trigger events, threshold levels associated with particular priority status triggers and/or priority status trigger events are also defined at DEFINE PRIORITY STATUS TRIGGERS OPERATION 207. In one embodiment, levels associated with a particular priority status trigger and/or trigger event can include the number of individual units of an inventory item, or inventory item class, being subjected to a priority status trigger and/or trigger event or the number of priority status triggers and/or priority status trigger events applied to any units of an inventory item, or inventory item class or the type of priority status triggers and/or priority status trigger events applied to any units of an inventory item, or inventory item class.

In one embodiment, some, or all of, the priority status triggers and/or trigger events, and threshold levels associated with particular priority status triggers and/or priority status trigger events are provided by a user community, and/or the provider of a computing system implemented financial management system employing process for verifying inventory in sub-sets using trigger parameters 200, and/or a provider of process for verifying inventory in sub-sets using trigger parameters 200, and/or any third party institution and/or individual, at DEFINE PRIORITY STATUS TRIGGERS OPERATION 207.

In one embodiment, the priority status triggers and/or trigger events, and threshold levels associated with particular priority status triggers and/or priority status trigger events are provided by a user community, and/or the provider of a computing system implemented financial management system employing process for verifying inventory in sub-sets using trigger parameters 200, and/or a provider of process for verifying inventory in sub-sets using trigger parameters 200, and/or any third party institution and/or individual, at DEFINE PRIORITY STATUS TRIGGERS OPERATION 207 in the form of data stored in and/or on, contained in and/or on, transferred, transmitted, or otherwise made available to the user of and/or process for verifying inventory in sub-sets using trigger parameters 200 by any of the various means discussed herein and/or known to those of skill in the art, whether known or available at the time of filing or as developed thereafter.

In other embodiments, the priority status triggers and/or trigger events, and threshold levels associated with particular priority status triggers and/or priority status trigger events are provided by a user community, and/or the provider of a computing system implemented financial management system employing process for verifying inventory in sub-sets using trigger parameters 200, and/or a provider of process for verifying inventory in sub-sets using trigger parameters 200, and/or any third party institution and/or individual, at DEFINE PRIORITY STATUS TRIGGERS OPERATION 207 in any electronic format and/or paper format, and/or printed format, and/or any other form of transferring information.

To a large degree, the determination as to what is to be defined as a priority status trigger and/or a priority status trigger event is a business decision and will therefore vary considerably from process-to-process, business-to-business, and user-to-user. In one embodiment, once the priority status triggers and/or priority status trigger events are defined they are linked to a given inventory item, or inventory item class, and monitored as discussed below.

In one embodiment, one of the priority status triggers and/or priority status trigger events defined at DEFINE PRIORITY STATUS TRIGGERS OPERATION 207 is one or more occurrences of one or more units of a given inventory item, or inventory item class, being handled and/or processed more than a threshold amount. In one embodiment, being handled includes, but is not limited to, instances where one or more units of a given inventory item, or inventory item class: has more than a threshold number of replacement units of the inventory item added; more than a threshold number of units of the inventory item being removed; more than a threshold number of units of the inventory item being returned; a particularly large number of sales of units of the inventory item; changing a display or storage area for the inventory item, or inventory item class; or any other action or actions involving units of an inventory item, or inventory item class, whereby one or more units of the inventory item, or inventory class, is handled and/or modified, either physically, or electronically by a computing system implemented financial management system employing process for verifying inventory in sub-sets using trigger parameters 200.

In one embodiment, one more units of an inventory item being handled is defined as a priority status trigger based on the theory that the more often units of an inventory item, or inventory item class, are handled, either physically or electronically, the more opportunity there is for the introduction of error and therefore an inventory item, or inventory item class, being handled beyond a threshold level is considered to make the inventory item, or inventory item class, particularly susceptible to inaccuracies between physical inventory count and inventory as calculated by the computing system implemented financial management system and/or trigger.

In one embodiment, one of the priority status triggers and/or priority status trigger events defined at DEFINE PRIORITY STATUS TRIGGERS OPERATION 207 is historical data showing inaccuracies/discrepancies between physical inventory count and inventory as calculated by the computing system implemented financial management system. In this embodiment, once an inventory item, or inventory item class, exhibits inaccuracies/discrepancies between physical inventory counts and inventory as calculated by the computing system implemented financial management system more than a threshold number of times, and/or by more than a threshold discrepancy amount, then that inventory item, or inventory item class, itself becomes a priority status trigger. This action is taken based on the theory that an inventory item, or inventory item class, exhibiting a history of inaccuracies/discrepancies between physical inventory count and inventory as calculated by the computing system implemented financial management system is likely to have similar problems in the future.

In one embodiment, one of the priority status triggers and/or priority status trigger events defined at DEFINE PRIORITY STATUS TRIGGERS OPERATION 207 is based, at least in part, on how much time has passed since the last time the inventory item, or inventory item class, was given a physical inventory count. In one embodiment, the user can designate a predefined maximum time interval between physical inventories of any inventory item, or inventory item class, after which the user believes that the inventory item, or inventory item class, becomes subject to inaccuracies/discrepancies between physical inventory and inventory as calculated by the computing system implemented financial management system. Therefore, in one embodiment, a time interval greater than the predefined maximum time interval between physical inventories is defined as a priority status trigger event.

In some embodiments, the predefined maximum time interval between physical inventories will vary from inventory item-to-inventory item and inventory item class-to-inventory item class as dictated by process for verifying inventory in sub-sets using trigger parameters 200 and/or as defined/desired by the user. Using this embodiment, a user can use process for verifying inventory in sub-sets using trigger parameters 200 as an automatic reminder to ensure that all inventory items, or inventory item classes, are physically inventoried a predefined number of times within a predefined time frame, typically on a rotational basis as determined by process for verifying inventory in sub-sets using trigger parameters 200 and/or as defined/desired by the user. Therefore, using process for verifying inventory in sub-sets using trigger parameters 200, the currently common large-scale full physical inventories can be avoided and more accurate inventory results are available at any given time.

In one embodiment, other priority status triggers and/or priority status trigger events defined at DEFINE PRIORITY STATUS TRIGGERS OPERATION 207 are provided by the user based on any criteria and/or historical data the user desires including, but not limited to: susceptibility of an inventory item, or inventory item class, to breakage; shelf lives of inventory items, or inventory item classes; purchase price and/or sale price and/or profit margin for an inventory item, or inventory item class; the relative importance of the inventory item, or inventory item class to user's core business; whether the inventory item, or the inventory item class, is a sub-component, or sub-set, of a larger product or inventory item, or inventory item class; seasonal considerations; speed of sale; or any other attribute, criteria, or consideration the user desires.

In one embodiment, once the priority status triggers and/or priority status trigger events are defined at DEFINE PRIORITY STATUS TRIGGERS OPERATION 207, process flow proceeds to STORE PRIORITY STATUS TRIGGERS DATA OPERATION 209.

In one embodiment, at STORE PRIORITY STATUS TRIGGERS DATA OPERATION 209 data representing the priority status triggers and/or priority status trigger events defined at DEFINE PRIORITY STATUS TRIGGERS OPERATION 207 is stored and/or saved by storing/saving the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in a computer readable medium, and/or any other computer program product, as defined herein. In one embodiment, the data, in whole, or in part, is stored on a webpage or in a web-based system.

In some embodiments, the means for storing the data described above are maintained, in whole, or in part, by: the user, or a user computing system; a third party data storage institution; the provider of a parent computing system implemented financial management system employing a process for verifying inventory in sub-sets using trigger parameters, such as processes 200, 300, and/or 400; the provider of a process for verifying inventory in sub-sets using trigger parameters, such as processes 200, 300, and/or 400; any third party service or institution; or any other parties.

In one embodiment, once the data representing the priority status triggers and/or priority status trigger events defined at DEFINE PRIORITY STATUS TRIGGERS OPERATION 207 is stored and/or saved at STORE PRIORITY STATUS TRIGGERS DATA OPERATION 209, process flow proceeds to MONITOR INVENTORY ITEM TRANSACTIONS/EVENTS OPERATION 213.

At MONITOR INVENTORY ITEM TRANSACTIONS/EVENTS OPERATION 213 transactions and events associated with all units of the given inventory item, or inventory item class, are monitored for identification of a priority status trigger and/or priority status trigger event as defined at DEFINE PRIORITY STATUS TRIGGERS OPERATION 207.

In one embodiment all units of the given inventory item, or inventory item class, are monitored using a computing system implemented financial management system, such as those discussed above. As noted above, in one embodiment, a user implementing any of the computing system implemented financial management systems discussed above, will often already have obtained/entered data representing identification of an inventory item, or inventory item class, using the computing system implemented financial management system. In addition, many computing system implemented financial management systems are specifically designed to track and/or monitor all transactions associated with various inventory items. Consequently, in one embodiment, the monitoring of transactions and events associated with all units of the given inventory item, or inventory item class, at MONITOR INVENTORY ITEM TRANSACTIONS/EVENTS OPERATION 213 is accomplished, at least in part, by interfacing with, and gathering the data from, any of the computing system implemented financial management systems discussed above, whether available at the time of filing or as developed later.

In one embodiment, the monitoring of transactions and events associated with all units of the given inventory item, or inventory item class, at MONITOR INVENTORY ITEM TRANSACTIONS/EVENTS OPERATION 213 is also accomplished, at least in part, through electronic invoice and/or transaction records generated at the time of purchase, or sale, of the inventory item and typically kept by the user either using a computing system implemented financial management system or by saving the electronic invoice and/or transaction record by one or more of the various mechanisms for storing data known to those of skill in the art, and/or as discussed below, and/or as developed later.

In one embodiment, the monitoring of transactions and events associated with all units of the given inventory item, or inventory item class, at MONITOR INVENTORY ITEM TRANSACTIONS/EVENTS OPERATION 213 is accomplished, at least in part, using barcodes or RFID on the units of the inventory item itself and/or by scanning or receiving the information directly from the units of the inventory item or its packaging as the inventory item is purchased, put into inventory, warehoused, moved, sold, etc.

In other embodiments, the monitoring of transactions and events associated with all units of the given inventory item, or inventory item class, at MONITOR INVENTORY ITEM TRANSACTIONS/EVENTS OPERATION 213 is accomplished by any means, including manual entry, whether known or available at the time of filing or as later developed, for entering data associated with an inventory item into a computing system, computing device, database, server system, web page, or any other data storage and/or data display and/or data manipulation means or mechanism, whether known or available at the time of filing or as later developed.

Once transactions and events associated with all units of the given inventory item, or inventory item class, are being monitored for identification of a priority status trigger and/or priority status trigger event as defined at DEFINE PRIORITY STATUS TRIGGERS OPERATION 207 at MONITOR INVENTORY ITEM TRANSACTIONS/EVENTS OPERATION 213, process flow proceeds to DETECT PRIORITY STATUS TRIGGER/TRIGGER EVENT ASSOCIATED WITH INVENTORY ITEM OPERATION 215.

At DETECT PRIORITY STATUS TRIGGER/TRIGGER EVENT ASSOCIATED WITH INVENTORY ITEM OPERATION 215 a priority status trigger and/or priority status trigger event as defined at DEFINE PRIORITY STATUS TRIGGERS OPERATION 207 is detected while monitoring transactions and events associated with all units of the given inventory item, or inventory item class, at MONITOR INVENTORY ITEM TRANSACTIONS/EVENTS OPERATION 213. In one embodiment, once a priority status trigger and/or priority status trigger event as defined at DEFINE PRIORITY STATUS TRIGGERS OPERATION 207 is detected at DETECT PRIORITY STATUS TRIGGER/TRIGGER EVENT ASSOCIATED WITH INVENTORY ITEM OPERATION 215 that is associated with the given inventory item, or inventory item class, the associated inventory item, or inventory item class, is then considered at elevated risk for inaccuracies/discrepancies between actual physical inventory count and the inventory data in the computing system implemented financial management system employing/implementing process for verifying inventory in sub-sets using trigger parameters 200.

In one embodiment, once a priority status trigger and/or priority status trigger event as defined at DEFINE PRIORITY STATUS TRIGGERS OPERATION 207 is detected at DETECT PRIORITY STATUS TRIGGER/TRIGGER EVENT ASSOCIATED WITH INVENTORY ITEM OPERATION 215, process flow proceeds to SET STATUS OF INVENTORY ITEM TO PRIORITY VERIFY STATUS OPERATION 219.

As discussed above, once a priority status trigger and/or priority status trigger event as defined at DEFINE PRIORITY STATUS TRIGGERS OPERATION 207 is detected at DETECT PRIORITY STATUS TRIGGER/TRIGGER EVENT ASSOCIATED WITH INVENTORY ITEM OPERATION 215 that is associated with the given inventory item, or inventory item class, the associated inventory item, or inventory item class, is then considered at elevated risk for inaccuracies/discrepancies between actual physical inventory count and the inventory data in the computing system implemented financial management system employing/implementing process for verifying inventory in sub-sets using trigger parameters 200. Consequently, according to one embodiment, the inventory item, or inventory item class, should be subjected to a physical inventory verification count on a priority basis. Consequently, at SET STATUS OF INVENTORY ITEM TO PRIORITY VERIFY STATUS OPERATION 219, the given inventory item, or inventory item class, associated with the trigger event detected at DETECT PRIORITY STATUS TRIGGER/TRIGGER EVENT ASSOCIATED WITH INVENTORY ITEM OPERATION 215 is marked as a priority verify status inventory item, or inventory item class, at SET STATUS OF INVENTORY ITEM TO PRIORITY VERIFY STATUS OPERATION 219.

Numerous methods, processes, and apparatuses, implemented in either software, hardware, or a combination of hardware and software, for marking, changing a status of, or linking information to, an electronic representation of an object are well-known to those of skill in the art. Consequently, a more detailed discussion of methods, processes, and apparatuses for marking and inventory item, or inventory item class, as a priority verify status inventory item, or inventory item class, is omitted here to avoid detracting from the invention.

In one embodiment, once the given inventory item, or inventory item class, associated with the trigger event detected at DETECT PRIORITY STATUS TRIGGER/TRIGGER EVENT ASSOCIATED WITH INVENTORY ITEM OPERATION 215 is marked as a priority verify status inventory item, or inventory item class, at SET STATUS OF INVENTORY ITEM TO PRIORITY VERIFY STATUS OPERATION 219, process flow proceeds to ALERT USER OPERATION 223.

In one embodiment, at ALERT USER OPERATION 223 an alert and/or notification is generated and distributed to the user and/or a third-party designated by the user, such as the user's accountant, indicating that the status of the given inventory item, or inventory item class, has been changed to a priority verify status inventory item, or inventory item class, at SET STATUS OF INVENTORY ITEM TO PRIORITY VERIFY STATUS OPERATION 219.

In one embodiment, the alert and/or notification generated at ALERT USER OPERATION 223 is accomplished via communication between one or more computing systems such as computing systems 100 and 150 of FIG. 1 using a network such as network 130 that can be any network or network system that is of interest to a user such as a Local Area Network (LAN), a Wide Area Network (WAN), a public network, such as the Internet, a private network, or other network capable of allowing communication between two or more computing systems. In one embodiment, communication is facilitated using analog modems, digital modems, network interface cards, broadband connections, or any other means for communicably coupling computing systems, whether known at the time of filing or as later developed.

Returning to FIG. 2A, in one embodiment, the alert and/or notification is generated at ALERT USER OPERATION 223 and distributed via phone lines, phone signals or any other form of electronic audio/video/text or alert messaging and/or communication known at the time of filing or as later developed.

In one embodiment, the alert and/or notification generated at ALERT USER OPERATION 223 is in the form of a pop-up display shown on a display device such as display devices 115, 165, 125 of FIG. 1. FIG. 2B shows a representation of a display screen 231 on display device 230, such as display devices 115 and 165 of FIG. 1, including an alert display 240 (FIG. 2B) activated at ALERT USER OPERATION 223 (FIG. 2A) notifying the user that the status of the given inventory item, or inventory item class, has been changed to a priority verify status inventory item, or inventory item class, at SET STATUS OF INVENTORY ITEM TO PRIORITY VERIFY STATUS OPERATION 219 and recommending that the user perform a physical verification inventory of the given inventory item, or inventory item class, on a priority basis.

As seen in FIG. 2B, alert display 240 includes alert text 241 indicating, in this specific example, that "Due to one or more events and/or transactions involving units of inventory item A, inventory item A has been given priority verify status and therefore a physical inventory of inventory item A should be undertaken on a priority basis."

Those of skill in the art will readily recognize that the one example of an alert shown in FIG. 2B is exemplary only and that the information displayed, and the arrangement of the information displayed, in alert display 240 will vary significantly from process-to-process and user-to-user. For instance, in one embodiment, alert display 240 can include text indicating more specifically why a given inventory item, or inventory item class, has been given priority verify status. In other embodiments, alert display 240 appears periodically to remind the user to perform a physical verification inventory of the inventory item a on a priority basis. In other embodiments, alert display 240 can include a recommended time, or time window, within which to perform the physical verification inventory of the inventory item. In other embodiments, alert display 240 can include any information desired.

In one embodiment, alert screen 240 generated at ALERT USER OPERATION 223 (FIG. 2A) requires a positive action/acknowledgement such as check box 243 (FIG. 2B) from the user, or third party, before alert screen 240 can be closed or otherwise terminated.

In the embodiments discussed thus far, the alert and/or notification of the user to the fact that the given inventory item, or inventory item class, has been changed to a priority verify status inventory item, or inventory item class, at SET STATUS OF INVENTORY ITEM TO PRIORITY VERIFY STATUS OPERATION 219 is disclosed as being in the form of an alert screen, such as alert screen 240 (FIG. 2B) generated at ALERT USER OPERATION 223 (FIG. 2A). However, in other embodiments, the alert and/or notification of the user is accomplished by alert and/or notification means other than an alert screen, such as alert screen 240 (FIG. 2B) generated at ALERT USER OPERATION 223 (FIG. 2A).

For instance, in one embodiment the alert and/or notification of the user to the fact that the given inventory item, or inventory item class, has been changed to a priority verify status inventory item, or inventory item class, at SET STATUS OF INVENTORY ITEM TO PRIORITY VERIFY STATUS OPERATION 219 is accomplished at ALERT USER OPERATION 223 by providing the user with the information only in response to a user action such as a user query. In this embodiment, the user would be informed of the fact that the given inventory item, or inventory item class, has been changed to a priority verify status inventory item, or inventory item class, at ALERT USER OPERATION 223 in response to a user request for an inventory status report and/or inventory status update and/or priority verify status inventory listing and/or a general inventory report or listing, etc.

As another example, in one embodiment, the alert and/or notification of the user to the fact that the given inventory item, or inventory item class, has been changed to a priority verify status inventory item, or inventory item class, at SET STATUS OF INVENTORY ITEM TO PRIORITY VERIFY STATUS OPERATION 219 is accomplished at ALERT USER OPERATION 223 by providing the user a periodic report. In this embodiment, the notification of the user to the fact that the given inventory item, or inventory item class, has been changed to a priority verify status inventory item, or inventory item class, at SET STATUS OF INVENTORY ITEM TO PRIORITY VERIFY STATUS OPERATION 219 is accomplished at ALERT USER OPERATION 223 by process for verifying inventory in sub-sets using trigger parameters 200 automatically providing an inventory status report and/or inventory status update and/or priority verify status inventory listing and/or a general inventory report or listing, etc., on a periodic basis. In one embodiment, the periodic basis for providing the inventory status report and/or inventory status update and/or priority verify status inventory listing and/or a general inventory report or listing, etc., is defined by the user and/or the provider of process for verifying inventory in sub-sets using trigger parameters 200.

As another example, in one embodiment, the alert/notification of the user to the fact that the given inventory item, or inventory item class, has been changed to a priority verify status inventory item, or inventory item class, at SET STATUS OF INVENTORY ITEM TO PRIORITY VERIFY STATUS OPERATION 219 is accomplished at ALERT USER OPERATION 223 by highlighting, bolding, colorizing, or otherwise visually identifying the given inventory item, or inventory item class, that has been changed to a priority verify status in an inventory status report and/or inventory status update and/or priority verify status inventory listing and/or a general inventory report or listing, etc. generated and displayed for the user, upon request and/or on a periodic basis and/or automatically in response to a pre-defined user action.

In other embodiments, the alert/notification of the user to the fact that the given inventory item, or inventory item class, has been changed to a priority verify status inventory item, or inventory item class, at SET STATUS OF INVENTORY ITEM TO PRIORITY VERIFY STATUS OPERATION 219 is accomplished at ALERT USER OPERATION 223 by any means for providing notification to a user of the change in status of an inventory item, automatically and/or semi-automatically and/or manually and/or in response to a request or query and/or automatically in response to a pre-defined user action, whether known at the time of filing or as developed thereafter.

Returning to FIG. 2A, in one embodiment, once an alert is generated and distributed to the user, and/or a third-party designated by the user, at ALERT USER OPERATION 223, process flow proceeds to END OPERATION 225 and process for verifying inventory in sub-sets using trigger parameters 200 returns to MONITOR INVENTORY ITEM TRANSACTIONS/EVENTS OPERATION 213 to resume monitoring transactions and events associated with all units of the given inventory item, or inventory item class, for identification of a priority status trigger and/or priority status trigger event as defined at DEFINE PRIORITY STATUS TRIGGERS OPERATION 207.

Using process for verifying inventory in sub-sets using trigger parameters 200, inventory items, or classes of inventory items, that are particularly subject to inaccuracies and/or discrepancies between actual physical inventory count and inventory as calculated using a computing system implemented financial management system are automatically identified for the user, such as a small-business owner. Consequently, the user can prioritize inventory items, or inventory item classes, to be physically inventoried, and prioritize the order in which the inventory items, or inventory item classes, are physically inventoried based on real events. As a result, process for verifying inventory in sub-sets using trigger parameters 200 provides the user with an opportunity to perform physical inventory counts incrementally on relatively small sub-sets of inventory items, while at the same time providing most of the accuracy and benefits of a full physical inventory of all inventory items. In addition, a full physical inventory of all inventory items can still be performed, but using process for verifying inventory in sub-sets using trigger parameters 200 the full physical inventory can be performed incrementally and/or rotationally on sub-sets of the entire inventory over time using a schedule based on the information provided by process for verifying inventory in sub-sets using trigger parameters 200.

In some instances, it is desirable to establish a threshold number of priority status triggers and/or priority status trigger events associated with a given inventory item, or inventory item class, which must take place before the inventory item, or inventory item class, is provided priority verify status.

Figure 3:
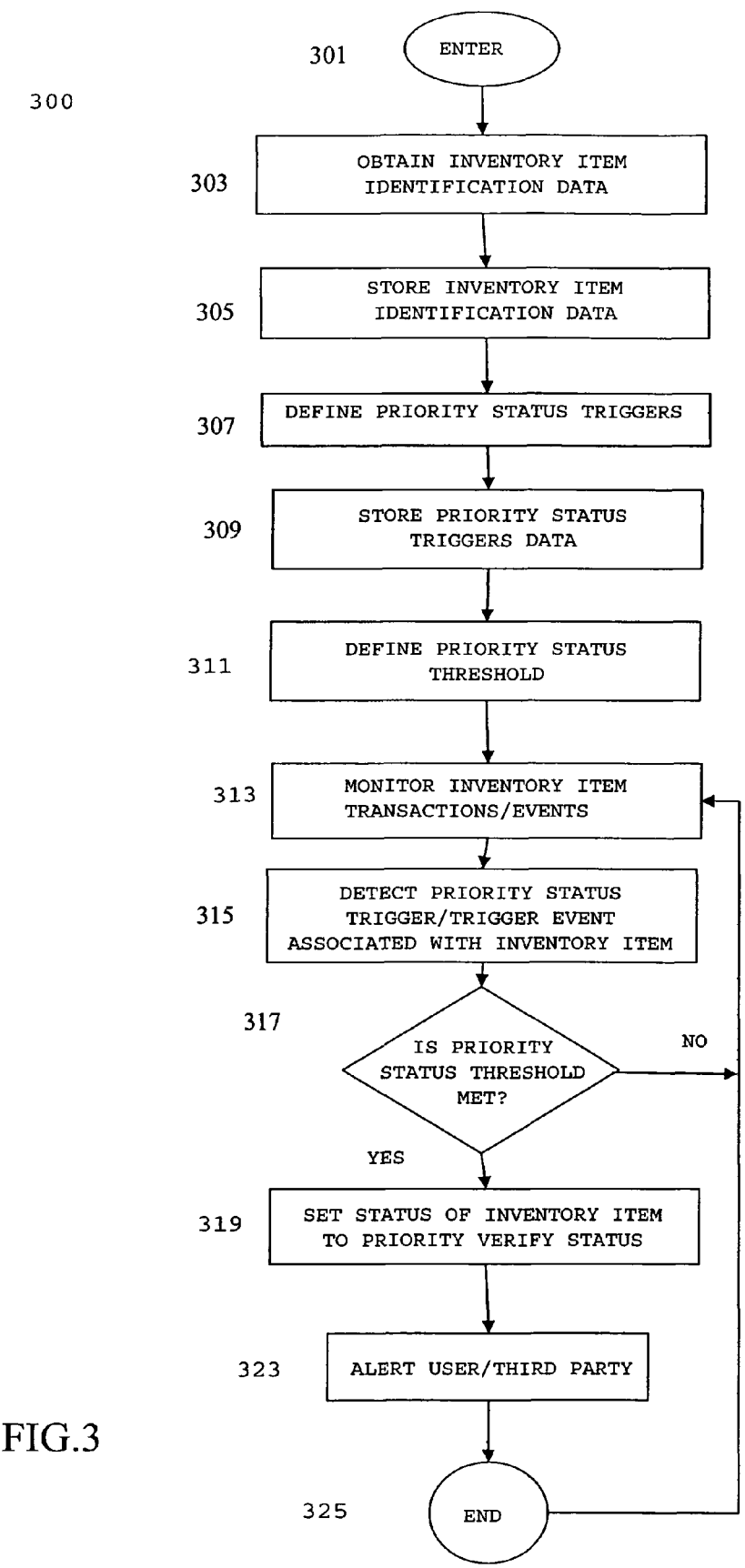
FIG. 3 is a flow chart depicting a process for verifying inventory in sub-sets using trigger parameters in accordance with one embodiment.

FIG. 3 is a flow chart depicting a process for verifying inventory in sub-sets using trigger parameters 300 in accordance with one embodiment including DEFINE PRIORITY STATUS THRESHOLD OPERATION 311 and IS PRIORITY STATUS THRESHOLD MET? OPERATION 317.

Process for verifying inventory in sub-sets using trigger parameters 300 begins at ENTER OPERATION 301 and process flow proceeds to OBTAIN INVENTORY ITEM IDENTIFICATION DATA OPERATION 303.

At OBTAIN INVENTORY ITEM IDENTIFICATION DATA OPERATION 303, data regarding the identification of an inventory item, or an inventory item class, is obtained by any one of the several methods discussed above with respect to OBTAIN INVENTORY ITEM IDENTIFICATION DATA OPERATION 203 of FIG. 2A, and/or known to those of skill in the art at the time of filing or as developed later.

Returning to FIG. 3, in one embodiment, once data regarding the identification of an inventory item, or an inventory item class, is obtained at OBTAIN INVENTORY ITEM IDENTIFICATION DATA OPERATION 303, process flow proceeds to STORE INVENTORY ITEM IDENTIFICATION DATA OPERATION 305.

At STORE INVENTORY ITEM IDENTIFICATION DATA OPERATION 305 data regarding the identification of the inventory item, or an inventory item class, obtained at OBTAIN INVENTORY ITEM IDENTIFICATION DATA OPERATION 303 is stored and/or saved by storing/saving the data, in whole, or in part, by any one of the numerous mechanisms known to those of skill in the art and/or as discussed above with respect to STORE INVENTORY ITEM IDENTIFICATION DATA OPERATION 205 of FIG. 2A.

Returning to FIG. 3, once the data regarding the identification of the inventory item, or the inventory item class, obtained at OBTAIN INVENTORY ITEM IDENTIFICATION DATA OPERATION 303 is stored and/or saved at STORE INVENTORY ITEM IDENTIFICATION DATA OPERATION 305, process flow proceeds to DEFINE PRIORITY STATUS TRIGGERS OPERATION 307.

At DEFINE PRIORITY STATUS TRIGGERS OPERATION 307 priority status triggers and/or priority status trigger events are defined by the user and/or a provider of process for verifying inventory in sub-sets using trigger parameters 300. In one embodiment, priority status triggers and/or priority status trigger events are defined that indicate that an inventory item, or inventory item class, is particularly susceptible to inaccuracies/discrepancies between physical inventory and inventory as calculated by the computing system implemented financial management system. In one embodiment, the priority status triggers and/or priority status trigger events are defined DEFINE PRIORITY STATUS TRIGGERS OPERATION 307 by any of the methods and/or means described above with respect to DEFINE PRIORITY STATUS TRIGGERS OPERATION 207 of FIG. 2A.

Returning to FIG. 3, in one embodiment, once priority status triggers and/or priority status trigger events are defined at DEFINE PRIORITY STATUS TRIGGERS OPERATION 307, process flow proceeds to STORE PRIORITY STATUS TRIGGERS DATA OPERATION 309.

At STORE PRIORITY STATUS TRIGGERS DATA OPERATION 309, data regarding the priority status triggers and/or priority status trigger events defined at DEFINE PRIORITY STATUS TRIGGERS OPERATION 307 is stored and/or saved by storing/saving the data, in whole, or in part, by any one of the numerous mechanisms known to those of skill in the art and/or as discussed above with respect to STORE PRIORITY STATUS TRIGGERS DATA OPERATION 209 of FIG. 2A.

Returning to FIG. 3, in on embodiment, once the data regarding the priority status triggers and/or priority status trigger events are defined at DEFINE PRIORITY STATUS TRIGGERS OPERATION 307 and stored and/or saved at STORE PRIORITY STATUS TRIGGERS DATA OPERATION 309, process flow proceeds to DEFINE PRIORITY STATUS THRESHOLD OPERATION 311.

At DEFINE PRIORITY STATUS THRESHOLD OPERATION 311 a user of process for verifying inventory in sub-sets using trigger parameters 300 is provided the opportunity to establish a threshold number of priority status triggers and/or priority status trigger events associated with a given inventory item, or inventory item class, which must take place before the inventory item, or inventory item class, is assigned priority verify status.

In one embodiment, the threshold number of priority status triggers and/or priority status trigger events to assign priority verify status is a specified number of any priority status triggers and/or priority status trigger events being associated with a given inventory item, or inventory item class. In other embodiments, certain priority status triggers and/or priority status trigger events are defined by the user to be more significant than other priority status triggers and/or priority status trigger events and these priority status triggers and/or priority status trigger events are given more weight. As a specific illustrative example, a user may define a history of discrepancies between physical inventory and electronic inventory as a relatively serious, and therefore high priority, priority status trigger event while a lapsed time between physical inventories beyond the maximum defined time interval between physical inventories might be defined as a relatively less serious, and therefore lower priority, priority status trigger event.

In one embodiment, the threshold number of priority status triggers and/or priority status trigger events associated with a given inventory item, or inventory item class, which must take place before the inventory item, or inventory item class, is assigned priority verify status is provided by a user community, and/or the provider of a computing system implemented financial management system employing process for verifying inventory in sub-sets using trigger parameters 300, and/or a provider of process for verifying inventory in sub-sets using trigger parameters 300, and/or any third party institution and/or individual, at DEFINE PRIORITY STATUS THRESHOLD OPERATION 311 as discussed above with respect to DEFINE PRIORITY STATUS TRIGGERS OPERATION 207 of FIG. 2A.

How the threshold number of, or severity/weight given to, priority status triggers and/or priority status trigger events associated with a given inventory item, or inventory item class, which must take place before the inventory item, or inventory item class, is assigned priority verify status is determined is largely a business decision, and therefore, is typically user-defined and can vary significantly from process-to-process, business-to-business, and user-to-user. Consequently, the threshold number and/or weighting, of priority status triggers and/or priority status trigger events is determined at DEFINE PRIORITY STATUS THRESHOLD OPERATION 311 using any criteria or system defined and/or desired by the user.

In one embodiment, once a user of process for verifying inventory in sub-sets using trigger parameters 300 is provided the opportunity to establish a threshold number of priority status triggers and/or priority status trigger events associated with a given inventory item, or inventory item class, at DEFINE PRIORITY STATUS THRESHOLD OPERATION 311, process flow proceeds to MONITOR INVENTORY ITEM TRANSACTIONS/EVENTS OPERATION 313.

At MONITOR INVENTORY ITEM TRANSACTIONS/EVENTS OPERATION 313 transactions and events associated with all units of the given inventory item, or inventory item class, are monitored for identification of a priority status trigger and/or priority status trigger event as defined at DEFINE PRIORITY STATUS TRIGGERS OPERATION 307 by any method known to those of skill in art at the time of filing and/or as developed later and/or as discussed above with respect to MONITOR INVENTORY ITEM TRANSACTIONS/EVENTS OPERATION 213 of FIG. 2A.

Returning to FIG. 3, once transactions and events associated with all units of the given inventory item, or inventory item class, are being monitored for identification of a priority status trigger and/or priority status trigger event as defined at DEFINE PRIORITY STATUS TRIGGERS OPERATION 307, at MONITOR INVENTORY ITEM TRANSACTIONS/EVENTS OPERATION 313, process flow proceeds to DETECT PRIORITY STATUS TRIGGER AND/OR PRIORITY STATUS TRIGGER EVENT ASSOCIATED WITH INVENTORY ITEM OPERATION 315.

At DETECT PRIORITY STATUS TRIGGER AND/OR PRIORITY STATUS TRIGGER EVENT ASSOCIATED WITH INVENTORY ITEM OPERATION 315 a priority status trigger and/or priority status trigger event as defined at DEFINE PRIORITY STATUS TRIGGERS OPERATION 307 is detected while monitoring transactions and events associated with all units of the given inventory item, or inventory item class, at MONITOR INVENTORY ITEM TRANSACTIONS/EVENTS OPERATION 313.

In one embodiment, once a priority status trigger and/or priority status trigger event as defined at DEFINE PRIORITY STATUS TRIGGERS OPERATION 307 is detected while monitoring transactions and events associated with all units of the given inventory item, or inventory item class, at MONITOR INVENTORY ITEM TRANSACTIONS/EVENTS OPERATION 313 at DETECT PRIORITY STATUS TRIGGER AND/OR PRIORITY STATUS TRIGGER EVENT ASSOCIATED WITH INVENTORY ITEM OPERATION 315, process flow proceeds to IS PRIORITY STATUS THRESHOLD MET? OPERATION 317.

At IS PRIORITY STATUS THRESHOLD MET? OPERATION 317 a determination is made as to whether the threshold number of priority status triggers and/or priority status trigger events associated with a given inventory item, or inventory item class, which must take place before the inventory item, or inventory item class, is provided priority verify status, as defined at DEFINE PRIORITY STATUS THRESHOLD OPERATION 311, is met, or surpassed, by the detection of the priority status trigger and/or priority status trigger event at DETECT PRIORITY STATUS TRIGGER AND/OR PRIORITY STATUS TRIGGER EVENT ASSOCIATED WITH INVENTORY ITEM OPERATION 315.

If it is determined at IS PRIORITY STATUS THRESHOLD MET? OPERATION 317 that priority verify status threshold defined at DEFINE PRIORITY STATUS THRESHOLD OPERATION 311 is not met, i.e., a "no: result is obtained, no action is taken and process for verifying inventory in sub-sets using trigger parameters 300 returns to MONITOR INVENTORY ITEM TRANSACTIONS/EVENTS OPERATION 313 to await the next detection.

On the other hand, if it is determined at IS PRIORITY STATUS THRESHOLD MET? OPERATION 317 that priority verify status threshold defined at DEFINE PRIORITY STATUS THRESHOLD OPERATION 311 is met i.e., a "yes" result is obtained, process flow proceeds to SET STATUS OF INVENTORY ITEM TO PRIORITY VERIFY STATUS OPERATION 319.

At SET STATUS OF INVENTORY ITEM TO PRIORITY VERIFY STATUS OPERATION 319, the given inventory item, or inventory item class, associated with the trigger event detected at DETECT PRIORITY STATUS TRIGGER/TRIGGER EVENT ASSOCIATED WITH INVENTORY ITEM OPERATION 315 is marked as a priority verify status inventory item, or inventory item class, at SET STATUS OF INVENTORY ITEM TO PRIORITY VERIFY STATUS OPERATION 319 by the methods and/or means discussed above with respect to SET STATUS OF INVENTORY ITEM TO PRIORITY VERIFY STATUS OPERATION 219 of FIG. 2A.

Returning to FIG. 3, in one embodiment, once the given inventory item, or inventory item class, associated with the trigger event detected at DETECT PRIORITY STATUS TRIGGER/TRIGGER EVENT ASSOCIATED WITH INVENTORY ITEM OPERATION 315 is marked as a priority verify status inventory item, or inventory item class, at SET STATUS OF INVENTORY ITEM TO PRIORITY VERIFY STATUS OPERATION 319, process flow proceeds to ALERT USER OPERATION 323.

In one embodiment, at ALERT USER OPERATION 323 an alert is generated and distributed to the user and/or a third-party designated by the user, such as the user's accountant, indicating that the status of the given inventory item, or inventory item class, has been changed to priority verify status inventory item, or inventory item class, at SET STATUS OF INVENTORY ITEM TO PRIORITY VERIFY STATUS OPERATION 319 by the methods discussed above with respect to ALERT USER OPERATION 223 of FIG. 2A.

Returning to FIG. 3, in one embodiment, once an alert is generated and distributed to the user, and/or a third-party designated by the user, at ALERT USER OPERATION 323, process flow proceeds to END OPERATION 325 and process for verifying inventory in sub-sets using trigger parameters 300 returns to MONITOR INVENTORY ITEM TRANSACTIONS/EVENTS OPERATION 313 to resume monitoring transactions and events associated with all units of the given inventory item, or inventory item class, for identification of a priority status trigger and/or priority status trigger event as defined at DEFINE PRIORITY STATUS TRIGGERS OPERATION 307.

In some instances, where two or more inventory items, or inventory item classes, have been given priority verify status, it is desirable to further prioritize the two or more priority verify status inventory items, or inventory item classes with respect to each other.

Figure 4A:
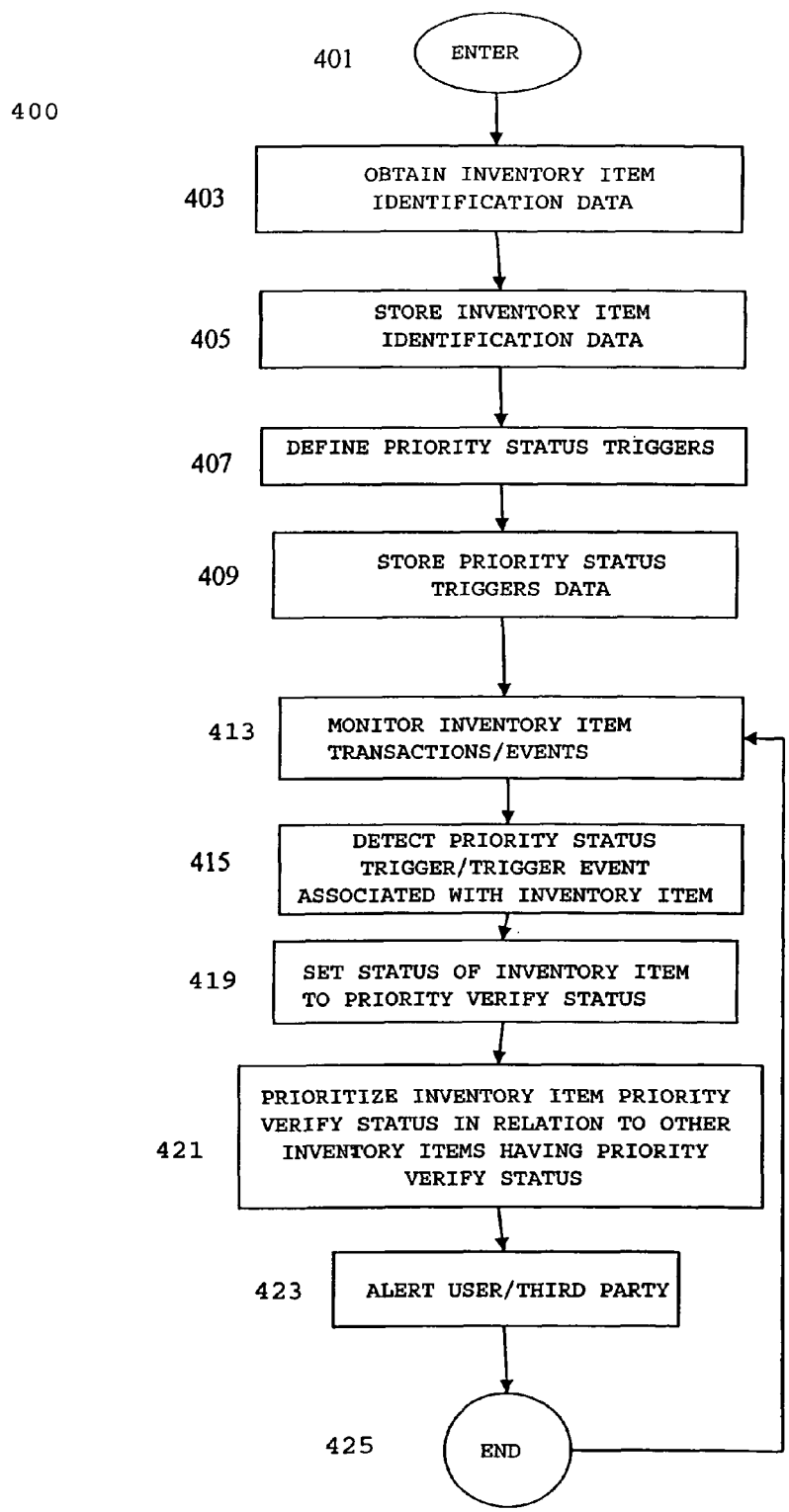
FIG. 4A is a flow chart depicting a process for verifying inventory in sub-sets using trigger parameters in accordance with one embodiment.

FIG. 4A is a flow chart depicting a process for verifying inventory in sub-sets using trigger parameters 400 in accordance with one embodiment including PRIORITIZE INVENTORY ITEM PRIORITY VERIFY STATUS IN RELATION TO OTHER INVENTORY ITEMS HAVING PRIORITY VERIFY STATUS OPERATION 421.

Process for verifying inventory in sub-sets using trigger parameters 400 begins at ENTER OPERATION 401 and process flow proceeds to OBTAIN INVENTORY ITEM IDENTIFICATION AND PURCHASE PRICE DATA OPERATION 403.

OBTAIN INVENTORY ITEM IDENTIFICATION DATA OPERATION 403; STORE INVENTORY ITEM IDENTIFICATION DATA OPERATION 405; DEFINE PRIORITY STATUS TRIGGERS OPERATION 407; STORE PRIORITY STATUS TRIGGERS DATA OPERATION 409; MONITOR INVENTORY ITEM TRANSACTIONS/EVENTS OPERATION 413; DETECT PRIORITY STATUS TRIGGER/TRIGGER EVENT ASSOCIATED WITH INVENTORY ITEM OPERATION 415; and SET STATUS OF INVENTORY ITEM TO PRIORITY VERIFY STATUS OPERATION 419 of process for verifying inventory in sub-sets using trigger parameters 400 of FIG. 4A are substantially identical to OBTAIN INVENTORY ITEM IDENTIFICATION DATA OPERATION 203; STORE INVENTORY ITEM IDENTIFICATION DATA OPERATION 205; DEFINE PRIORITY STATUS TRIGGERS OPERATION 207; STORE PRIORITY STATUS TRIGGERS DATA OPERATION 209; MONITOR INVENTORY ITEM TRANSACTIONS/EVENTS OPERATION 213; and DETECT PRIORITY STATUS TRIGGER/TRIGGER EVENT ASSOCIATED WITH INVENTORY ITEM OPERATION 215 of process for verifying inventory in sub-sets using trigger parameters 200 of FIG. 2A. Consequently, the discussion and description of OBTAIN INVENTORY ITEM IDENTIFICATION DATA OPERATION 203; STORE INVENTORY ITEM IDENTIFICATION DATA OPERATION 205; DEFINE PRIORITY STATUS TRIGGERS OPERATION 207; STORE PRIORITY STATUS TRIGGERS DATA OPERATION 209; MONITOR INVENTORY ITEM TRANSACTIONS/EVENTS OPERATION 213; and DETECT PRIORITY STATUS TRIGGER/TRIGGER EVENT ASSOCIATED WITH INVENTORY ITEM OPERATION 215 of process for verifying inventory in sub-sets using trigger parameters 200 of FIG. 2A is applicable to, and incorporated herein for, similarly labeled and named elements such as: OBTAIN INVENTORY ITEM IDENTIFICATION DATA OPERATION 403; STORE INVENTORY ITEM IDENTIFICATION DATA OPERATION 405; DEFINE PRIORITY STATUS TRIGGERS OPERATION 407; STORE PRIORITY STATUS TRIGGERS DATA OPERATION 409; MONITOR INVENTORY ITEM TRANSACTIONS/EVENTS OPERATION 413; DETECT PRIORITY STATUS TRIGGER/TRIGGER EVENT ASSOCIATED WITH INVENTORY ITEM OPERATION 415; and SET STATUS OF INVENTORY ITEM TO PRIORITY VERIFY STATUS OPERATION 419 of process for verifying inventory in sub-sets using trigger parameters 400 of FIG. 4A.

In one embodiment, once the given inventory item, or inventory item class, associated with the trigger event detected at DETECT PRIORITY STATUS TRIGGER/TRIGGER EVENT ASSOCIATED WITH INVENTORY ITEM OPERATION 415 is marked as a priority verify status inventory item, or inventory item class, at SET STATUS OF INVENTORY ITEM TO PRIORITY VERIFY STATUS OPERATION 419, process flow proceeds to PRIORITIZE INVENTORY ITEM PRIORITY VERIFY STATUS IN RELATION TO OTHER INVENTORY ITEMS HAVING PRIORITY VERIFY STATUS OPERATION 421.

In one embodiment, at PRIORITIZE INVENTORY ITEM PRIORITY VERIFY STATUS IN RELATION TO OTHER INVENTORY ITEMS HAVING PRIORITY VERIFY STATUS OPERATION 421 the priority verify status of the priority verify status inventory item, or inventory item class, set at SET STATUS OF INVENTORY ITEM TO PRIORITY VERIFY STATUS OPERATION 419 is examined, and/or compared, with the priority verify status of other priority verify status inventory items, or inventory item classes. In one embodiment, as a result of this examination and/or comparison, a relative priority verify status for the priority verify status inventory item, and/or inventory item class, with respect to other priority verify status inventory items, and/or inventory item classes, is determined and, in one embodiment, a list showing the relative priority verify status of all priority verify status inventory items, and or inventory item classes, is provided to the user, in one embodiment, in an alert as discussed below.

In one embodiment, the relative priority verify status of a priority verify status inventory item with respect to other priority verify status inventory items is determined at PRIORITIZE INVENTORY ITEM PRIORITY VERIFY STATUS IN RELATION TO OTHER INVENTORY ITEMS HAVING PRIORITY VERIFY STATUS OPERATION 421 based on the number, and or the severity, of the priority status triggers and/or priority status trigger events that resulted in the given priority verify status inventory item being assigned priority verify status. In one embodiment, those priority verify status inventory items with the greater number of priority status triggers and/or priority status trigger events are given higher priority verify status. In one embodiment, this is accomplished by providing varying levels of priority verify status such as, level 1 priority, level 2 priority, etc. or by employing any other type of tiered priority verify status system.

In other embodiments, certain priority status triggers and/or priority status trigger events are defined by the user to be more significant than other priority status triggers and/or priority status trigger events at PRIORITIZE INVENTORY ITEM PRIORITY VERIFY STATUS IN RELATION TO OTHER INVENTORY ITEMS HAVING PRIORITY VERIFY STATUS OPERATION 421. In other words, the priority status triggers and/or priority status trigger events are themselves prioritized. As a specific illustrative example, a user may define a history of discrepancies between physical inventory and electronic inventory as a relatively serious, and therefore high priority, priority status trigger event while a lapsed time between physical inventories beyond the maximum defined time interval between physical inventories might be defined as a relatively less serious, and therefore lower priority, priority status trigger event.

In one embodiment, the relative priority verify status of a priority verify status inventory item with respect to other priority verify status inventory items is determined at PRIORITIZE INVENTORY ITEM PRIORITY VERIFY STATUS IN RELATION TO OTHER INVENTORY ITEMS HAVING PRIORITY VERIFY STATUS OPERATION 421 based on information/data that is provided by a user community, and/or the provider of a computing system implemented financial management system employing process for verifying inventory in sub-sets using trigger parameters 400, and/or a provider of process for verifying inventory in sub-sets using trigger parameters 400, and/or any third party institution and/or individual, by methods similar to those discussed above with respect to DEFINE PRIORITY STATUS TRIGGERS OPERATION 207 of FIG. 2A.

The decision as to how to prioritize priority verify status inventory items, and/or priority verify status inventory item classes, and/or how to prioritize priority status triggers and/or priority status trigger events is, like the definition of priority status triggers and/or priority status trigger events themselves largely a business decision and will therefore vary considerably from process-to-process, business-to-business and user-to-user.

In one embodiment, once the relative priority verify status of the given priority verify status inventory item with respect to other priority verify status inventory items is determined at PRIORITIZE INVENTORY ITEM PRIORITY VERIFY STATUS IN RELATION TO OTHER INVENTORY ITEMS HAVING PRIORITY VERIFY STATUS OPERATION 421, process flow proceeds to ALERT USER OPERATION 423.

In one embodiment, at ALERT USER OPERATION 423 an alert and/or notification is generated and distributed to the user and/or a third-party designated by the user, such as the user's accountant, indicating that the status of the given inventory item, or inventory item class, has been changed to priority verify status inventory item, or inventory item class, at SET STATUS OF INVENTORY ITEM TO PRIORITY VERIFY STATUS OPERATION 419 and, in one embodiment, the user is provided with a list showing the relative priority verify status of all priority verify status inventory items, and/or inventory item classes, as determined at PRIORITIZE INVENTORY ITEM PRIORITY VERIFY STATUS IN RELATION TO OTHER INVENTORY ITEMS HAVING PRIORITY VERIFY STATUS OPERATION 421.

In one embodiment, the alert and/or notification generated at ALERT USER OPERATION 423 is accomplished via communication between one or more computing systems such as computing systems 100 and 150 of FIG. 1 using a network such as network 130 that can be any network or network system that is of interest to a user such as a Local Area Network (LAN), a Wide Area Network (WAN), a public network, such as the Internet, a private network, or other network capable of allowing communication between two or more computing systems. In one embodiment, communication is facilitated using analog modems, digital modems, network interface cards, broadband connections, or any other means for communicably coupling computing systems, whether known at the time of filing or as later developed.

Returning to FIG. 4A, in one embodiment, the alert and/or notification is generated at ALERT USER OPERATION 423 and distributed via phone lines, phone signals or any other form of electronic audio/video/text or alert messaging and/or communication known at the time of filing or as later developed.

In one embodiment, the alert and/or notification generated at ALERT USER OPERATION 423 is in the form of a pop-up display shown on a display device such as display devices 115, 165, 125 of FIG. 1. FIG. 4B shows a representation of a display screen 431 on display device 430, such as display devices 115 and 165 of FIG. 1, including an alert display 440 (FIG. 4B) activated at ALERT USER OPERATION 423 (FIG. 4A) notifying the user that the status of the given inventory item, or inventory item class, has been changed to priority verify status inventory item, or inventory item class, at SET STATUS OF INVENTORY ITEM TO PRIORITY VERIFY STATUS OPERATION 419 and recommending that the user perform a physical inventory of the given inventory item, or inventory item class, on a priority basis. In addition, alert display 440 includes a priority listing of all priority verify status inventory items: Inventory Item A; Inventory Item C; Inventory Item D; and Inventory Item H, along with the priority level assigned.

Those of skill in the art will readily recognize that the one example of an alert shown in FIG. 4B is exemplary only and that the information displayed, and the arrangement of the information displayed, in alert display 440 will vary significantly from process-to-process and user-to-user. For instance, in one embodiment, alert display 440 can include text indicating more specifically why a given inventory item, or inventory item class, has been given priority verify status or why a particular priority verify status inventory item has been given its priority verify status relative to other priority verify status inventory items. In other embodiments, alert display 440 appears periodically to remind the user to perform a physical inventory of inventory item a on a priority basis. In other embodiments, alert display 440 can include a recommended time, or time window, within which to perform the physical verification inventory of the inventory item(s). In other embodiments, alert display 440 can include any information desired.

In one embodiment, alert screen 440 generated at ALERT USER OPERATION 423 (FIG. 4A) requires a positive action/acknowledgement such as check box 443 (FIG. 4B) from the user, or third party, before alert screen 440 can be closed or otherwise terminated.

In the embodiments discussed thus far, the alert and/or notification of the user to the fact that the given inventory item, or inventory item class, has been changed to a priority verify status inventory item, or inventory item class, at SET STATUS OF INVENTORY ITEM TO PRIORITY VERIFY STATUS OPERATION 419 is disclosed as being in the form of an alert screen, such as alert screen 440 (FIG. 4B) generated at ALERT USER OPERATION 443 (FIG. 4A). However, in other embodiments, the alert and/or notification of the user is accomplished by alert and/or notification means other than an alert screen, such as alert screen 440 (FIG. 4B) generated at ALERT USER OPERATION 443 (FIG. 4A).

For instance, in one embodiment the alert and/or notification of the user to the fact that the given inventory item, or inventory item class, has been changed to a priority verify status inventory item, or inventory item class, at SET STATUS OF INVENTORY ITEM TO PRIORITY VERIFY STATUS OPERATION 419 is accomplished at ALERT USER OPERATION 443 by providing the user with the information only in response to a user action such as a user query. In this embodiment, the user would be informed of the fact that the given inventory item, or inventory item class, has been changed to a priority verify status inventory item, or inventory item class, at ALERT USER OPERATION 443 in response to a user request for an inventory status report and/or inventory status update and/or priority verify status inventory listing and/or a general inventory report or listing, etc.

As another example, in one embodiment, the alert and/or notification of the user to the fact that the given inventory item, or inventory item class, has been changed to a priority verify status inventory item, or inventory item class, at SET STATUS OF INVENTORY ITEM TO PRIORITY VERIFY STATUS OPERATION 419 is accomplished at ALERT USER OPERATION 443 by providing the user a periodic report. In this embodiment, the notification of the user to the fact that the given inventory item, or inventory item class, has been changed to a priority verify status inventory item, or inventory item class, at SET STATUS OF INVENTORY ITEM TO PRIORITY VERIFY STATUS OPERATION 419 is accomplished at ALERT USER OPERATION 443 by process for verifying inventory in sub-sets using trigger parameters 400 automatically providing an inventory status report and/or inventory status update and/or priority verify status inventory listing and/or a general inventory report or listing, etc., on a periodic basis. In one embodiment, the periodic basis for providing the inventory status report and/or inventory status update and/or priority verify status inventory listing and/or a general inventory report or listing, etc., is defined by the user and/or the provider of process for verifying inventory in sub-sets using trigger parameters 400.

As another example, in one embodiment, the alert/notification of the user to the fact that the given inventory item, or inventory item class, has been changed to a priority verify status inventory item, or inventory item class, at SET STATUS OF INVENTORY ITEM TO PRIORITY VERIFY STATUS OPERATION 419 is accomplished at ALERT USER OPERATION 443 by highlighting, bolding, colorizing, or otherwise visually identifying the given inventory item, or inventory item class, that has been changed to a priority verify status in an inventory status report and/or inventory status update and/or priority verify status inventory listing and/or a general inventory report or listing, etc. generated and displayed for the user, upon request and/or on a periodic basis and/or automatically in response to a pre-defined user action.

In other embodiments, the alert/notification of the user to the fact that the given inventory item, or inventory item class, has been changed to a priority verify status inventory item, or inventory item class, at SET STATUS OF INVENTORY ITEM TO PRIORITY VERIFY STATUS OPERATION 419 is accomplished at ALERT USER OPERATION 443 by any means for providing notification to a user of the change in status of an inventory item, automatically and/or semi-automatically and/or manually and/or in response to a request or query and/or automatically in response to a pre-defined user action, whether known at the time of filing or as developed thereafter.

Returning to FIG. 4A, in one embodiment, once an alert is generated and distributed to the user, and/or a third-party designated by the user, at ALERT USER OPERATION 423, process flow proceeds to END OPERATION 425 and process for verifying inventory in sub-sets using trigger parameters 400 returns to MONITOR INVENTORY ITEM TRANSACTIONS/EVENTS OPERATION 413 to resume monitoring transactions and events associated with all units of the given inventory item, or inventory item class, for identification of a priority status trigger and/or priority status trigger event as defined at DEFINE PRIORITY STATUS TRIGGERS OPERATION 407.

In some embodiments, some, or all, of the data associated with, created by, processed by, used by, or modified by: process for verifying inventory in sub-sets using trigger parameters 200; process for verifying inventory in sub-sets using trigger parameters 300; and process for verifying inventory in sub-sets using trigger parameters 400 is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

In some embodiments, the means for storing the data described above are maintained, in whole, or in part, by: the user, or a user computing system; third party data storage institution; the provider of a parent computing system implemented financial management system employing a process for verifying inventory in sub-sets using trigger parameters, such as processes 200, 300, and/or 400; the provider of a process for verifying inventory in sub-sets using trigger parameters, such as processes 200, 300, and/or 400; any third party service or institution; or any other parties.

Using the method and apparatus to efficiently verify inventory and a process for verifying inventory in sub-sets using trigger parameters, disclosed herein, inventory items, or classes of inventory items, that are particularly subject to inaccuracies and/or discrepancies between actual physical inventory and inventory as calculated using a computing system implemented financial management system are automatically, and dynamically, identified for the user, such as a small-business owner, based on actual events involving the inventory item or class. Consequently, the user can prioritize inventory items, or inventory item classes, to be physically inventoried, and the order in which the inventory items, or inventory item classes, are physically inventoried. As a result, the process for verifying inventory in sub-sets using trigger parameters disclosed herein provides the user with an opportunity to perform physical inventory counts incrementally on relatively small sub-sets of inventory items, while at the same time providing most of the accuracy and benefits of a full physical inventory of all inventory items. In addition, a full physical inventory of all inventory items can still be performed, but using the process for verifying inventory in sub-sets using trigger parameters disclosed herein, the full physical inventory can be performed incrementally, and rotationally, on sub-sets of the entire inventory over time using a schedule based on the information provided by the process for verifying inventory in sub-sets using trigger parameters.

In addition, as discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components and/or operations described herein is merely exemplary, and not mandatory or significant. Consequently, functions performed by a single component and/or operation may, in other embodiments, be performed by multiple components and/or operations, and functions performed by multiple components and/or operations may, in other embodiments, be performed by a single component and/or operation.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining" "storing", "linking", "comparing", "monitoring", "calculating", "multiplying", "defining", "detecting", "setting", "alerting", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for process or application for verifying inventory in sub-sets using trigger parameters, discussed herein, are identified using a particular nomenclature for ease of description and understanding, but other nomenclature is often used in the art to identify equivalent operations.

In addition, the order of operations depicted in the FIG.s and discussed above was chosen for merely illustrative purposes. Those of skill in the art will readily recognize that different orders of operations can be implemented without departing from the scope of the invention as claimed below.

Therefore, numerous variations, whether explicitly provided for by the specification or implied by the specification or not, may be implemented by one of skill in the art in view of this disclosure.

What is claimed is:

1. A computing system implemented process for verifying inventory in sub-sets using trigger parameters comprising:
   two or more computing processors; and
   two or more memories coupled to the two or more computing processors, the two or more memories having computing processor executable instructions which when executed by the two or more processors, perform a process comprising:
   obtaining identification data representing first inventory item;
   storing the identification data representing the first inventory item;
   defining priority status trigger events for the first inventory item, each of the priority status trigger events for the first inventory item having a type and a severity,
   wherein
      the process is configured to manage each of following priority status trigger events depending on whether a given one of the triggers is defined by the user for a given inventory item:
      units of the inventory item being handled more than a threshold number of times;
      electronic data regarding the inventory item being changed more than a threshold number of times;
      a discrepancy between a physical inventory count of the inventory item and an electronic count of the inventory item occurring more than a threshold number of times; and a period of time between physical inventory counts of the inventory item being longer than a threshold maximum period of time;

creating data representing the priority status trigger events for the first inventory item;

storing the data representing the priority status trigger events for the first inventory item;

monitoring events involving one or more units of the first inventory item;

comparing data representing the monitored events involving one or more units of the inventory item with the data representing the priority status trigger events for the first inventory item;

detecting one or more priority status trigger events for the first inventory item involving one or more units of the inventory item; and setting a status of the first inventory item as priority verify status, thereby designating the inventory item as an inventory item requiring a prioritized physical verification inventory count.

2. The computing system implemented process for verifying inventory in sub-sets using trigger parameters of claim 1, wherein:

obtaining identification data representing an inventory item comprises obtaining identification data representing an inventory item using a computing system implemented financial management system.

3. The computing system implemented process for verifying inventory in sub-sets using trigger parameters of claim 1, further comprising:

alerting a user to the designation of the inventory item as priority verify status inventory item.

4. The computing system implemented process for verifying inventory in sub-sets using trigger parameters of claim 3, wherein:

obtaining identification data representing an inventory item comprises obtaining identification data representing an inventory item using a computing system implemented financial management system.

5. The computing system implemented process for verifying inventory in sub-sets using trigger parameters of claim 3, wherein:

the process is configured to manage each of following priority status trigger events depending on whether a given one of the triggers is defined by the user for a given inventory item: units of the inventory item being handled more than a threshold number of times;

electronic data regarding the inventory item being changed more than a threshold number of times;

a discrepancy between a physical inventory count of the inventory item and an electronic count of the inventory item occurring more than a threshold number of times; and a period of time between physical inventory counts of the inventory item being longer than a threshold maximum period of time.

6. A system for verifying inventory in sub-sets using trigger parameters comprising:

a computing system; and a processor for executing a process for verifying inventory in sub-sets using trigger parameters, the process for verifying inventory in sub-sets using trigger parameters comprising:

obtaining identification data representing an inventory item;

storing the identification data representing the inventory item;

defining priority status trigger events wherein the process is configured to manage each of following priority status trigger events depending on whether a given one of the triggers is defined by the user for a given inventory item:

units of the inventory item being handled more than a threshold number of times;

electronic data regarding the inventory item being changed more than a threshold number of times;

a discrepancy between a physical inventory count of the inventory item and an electronic count of the inventory item occurring more than a threshold number of times; and a period of time between physical inventory counts of the inventory item being longer than a threshold maximum period of time;

creating data representing the priority status trigger events;

storing the data representing the priority status trigger events;

monitoring events involving one or more units of the inventory item;

comparing data representing the monitored events involving one or more units of the inventory item with the data representing the priority status trigger events;

detecting one or more priority status trigger events involving one or more units of the inventory item; and setting a status of the inventory item as priority verify status, thereby designating the inventory item as an inventory item requiring a prioritized physical verification inventory count.

7. The system for verifying inventory in sub-sets using trigger parameters of claim 6, wherein:

obtaining identification data representing an inventory item comprises obtaining identification data representing an inventory item using a computing system implemented financial management system.

8. The system for verifying inventory in sub-sets using trigger parameters of claim 6, wherein:

the process for verifying inventory in sub-sets using trigger parameters further comprises:

alerting a user to the designation of the inventory item as priority verify status inventory item.

9. The system for verifying inventory in sub-sets using trigger parameters of claim 8, wherein:

obtaining identification data representing an inventory item comprises obtaining identification data representing an inventory item using a computing system implemented financial management system.

10. A computer program product for verifying inventory in sub-sets using trigger parameters comprising:

a nontransitory computer readable medium;

and computer program code, encoded on the computer readable medium, comprising computer readable instructions for:

obtaining identification data representing an inventory item;

storing the identification data representing the inventory item;

defining priority status trigger events wherein the process is configured to manage each of following priority status trigger events depending on whether a given one of the triggers is defined by the user for a given inventory item:

units of the inventory item being handled more than a threshold number of times;

electronic data regarding the inventory item being changed more than a threshold number of times;

a discrepancy between a physical inventory count of the inventory item and an electronic count of the inventory item occurring more than a threshold number of times; and a period of time between physical inventory counts of the inventory item being longer than a threshold maximum period of time;

creating data representing the priority status trigger events;

storing the data representing the priority status trigger events;

monitoring events involving one or more units of the inventory item;

comparing data representing the monitored events involving one or more units of the inventory item with the data representing the priority status trigger events;

detecting one or more priority status trigger events involving one or more units of the inventory item; and setting a status of the inventory item as priority verify status, thereby designating the inventory item as an inventory item requiring a prioritized physical verification inventory count.

11. The computer program product for verifying inventory in sub-sets using trigger parameters of claim 10, wherein:

obtaining identification data representing an inventory item comprises obtaining identification data representing an inventory item using a computing system implemented financial management system.

12. The computer program product for verifying inventory in sub-sets using trigger parameters of claim 10, wherein:

the computer program code includes program code configured to manage each of following priority status trigger events depending on whether a given one of the triggers is defined for a given inventory item:

units of the inventory item being handled more than a threshold number of times;

electronic data regarding the inventory item being changed more than a threshold number of times;

a discrepancy between a physical inventory count of the inventory item and an electronic count of the inventory item occurring more than a threshold number of times; and a period of time between physical inventory counts of the inventory item being longer than a threshold maximum period of time.

13. The computer program product for verifying inventory in sub-sets using trigger parameters of claim 10, wherein:

the computer program code, encoded on the computer readable medium, further comprises computer readable instructions for:

alerting a user to the designation of the inventory item as priority verify status inventory item.

14. The computer program product for verifying inventory in sub-sets using trigger parameters of claim 13, wherein:

obtaining identification data representing an inventory item comprises obtaining identification data representing an inventory item using a computing system implemented financial management system.

15. The computing system implemented process for verifying inventory in sub-sets using trigger parameters of claim 1 wherein defining priority status trigger events for the first inventory item comprises receiving from a user community a definition of one or more priority status trigger events associated with the first inventory item.

16. The computing system implemented process for verifying inventory in sub-sets using trigger parameters of claim 1, further comprising:

obtaining identification data representing a second inventory item;

storing the identification data representing the second inventory item;

defining priority status trigger events for the second inventory item, the priority status triggers for the second inventory item being different than the priority status triggers defined for the first inventory item, each of the priority status trigger events for the second inventory item having a type and a severity;

creating data representing the priority status trigger events for the second inventory item;

storing the data representing the priority status trigger events for the second inventory item;

monitoring events involving one or more units of the second inventory item;

comparing data representing the monitored events involving one or more units of the inventory item with the data representing the priority status trigger events for the second inventory item;

detecting one or more priority status trigger events for the second inventory item involving one or more units of the inventory item;

setting a status of the second inventory item as priority verify status, the status for the second inventory item being different than the status set for the first inventory item, the respective statuses set for each of the first and second inventory items being based on a number of priority status triggers having occurred for the respective inventory item, and a severity of priority status triggers having occurred for the respective inventory item; and alerting a user to the priority status of each of the first and second inventory items, ranking, in the alert, the first and second inventory items according to their respective priority statuses.

* * * * *